Oct. 4, 1960 J. E. OSTLINE ET AL 2,955,163

AUTOMATIC TOLL TICKETING TELEPHONE SYSTEM

Filed April 3, 1957 17 Sheets-Sheet 1

INVENTORS
John E. Ostline
Swen W. Benson
Maurice H. Espersath

BY C. A. Gulbrandsen
Atty.

INVENTORS
John E. Ostline
Swan W. Benson
Maurice F. Epworth
BY C. A. Gulbrandsen
Atty.

Oct. 4, 1960 J. E. OSTLINE ET AL 2,955,163

AUTOMATIC TOLL TICKETING TELEPHONE SYSTEM

Filed April 3, 1957 17 Sheets-Sheet 3

INVENTORS
John E. Ostline
Swan W. Benson
Maurice H. Capetseth

BY C. A. Gulbrandsen
Atty.

Oct. 4, 1960 J. E. OSTLINE ET AL 2,955,163

AUTOMATIC TOLL TICKETING TELEPHONE SYSTEM

Filed April 3, 1957 17 Sheets-Sheet 4

INVENTORS
John E. Ostline
Ewan W. Benson
Maurice H. Epsworth

BY C. A. Gulbrandsen
Atty.

AUTOMATIC TOLL TICKETING TELEPHONE SYSTEM

Filed April 3, 1957 17 Sheets-Sheet 5

INVENTORS
John E. Ostline
Swan W. Benson
Maurice H. Coppersmith
BY
C. A. Gulbrandsen
Atty.

AUTOMATIC TOLL TICKETING TELEPHONE SYSTEM

Filed April 3, 1957

17 Sheets-Sheet 6

INVENTORS
John E. Ostline
Swan W. Benson
Maurice F. Caprenetti
BY
C. A. Gulbrandsen
Atty.

AUTOMATIC TOLL TICKETING TELEPHONE SYSTEM

Filed April 3, 1957 17 Sheets-Sheet 7

INVENTORS
John E. Ostline
Ewan W. Benson
Maurice H. Esperseth
BY
C. A. Gulbrandsen
Atty.

AUTOMATIC TOLL TICKETING TELEPHONE SYSTEM

INVENTORS
John E. Ostline
Swan W. Benson
Maurice H. Esperuth
BY
C. A. Gulbrandsen
Atty.

Oct. 4, 1960 J. E. OSTLINE ET AL 2,955,163

AUTOMATIC TOLL TICKETING TELEPHONE SYSTEM

Filed April 3, 1957 17 Sheets-Sheet 9

INVENTORS
John E. Ostline
Swan W. Benson
Maurice H. Espenseth
BY
C. A. Gulbranson
Atty.

INVENTORS
John E. Ostline
Ewan W. Benson
Maurice H. Esperseth
BY
C. A. Gullbrandsen
Atty

AUTOMATIC TOLL TICKETING TELEPHONE SYSTEM

Filed April 3, 1957 17 Sheets-Sheet 11

INVENTORS
John E. Ostline
Swan W. Benson
Maurice A. Epsworth
BY
C. A. Gulbrandsen
Atty.

INVENTORS
John E. Ostline
Swan W. Benson
Maurice H. Esperseth
BY
C. A. Gulbrandsen
Atty.

INVENTORS
John E. Ostline
Ewan W. Bensen
Maurice H. Experseth
BY C. A. Gulbrandsen
Atty.

INVENTORS
John E. Ostline
Swan W. Benson
Maurice H. Esperseth
BY
C. A. Gulbrandsen
Atty.

Oct. 4, 1960 J. E. OSTLINE ET AL 2,955,163

AUTOMATIC TOLL TICKETING TELEPHONE SYSTEM

Filed April 3, 1957 17 Sheets-Sheet 15

INVENTORS
John E. Ostline
Swan W. Benson
Maurice H. Esposito
BY
C. A. Gulbrandsen
Atty.

Oct. 4, 1960 J. E. OSTLINE ET AL 2,955,163

AUTOMATIC TOLL TICKETING TELEPHONE SYSTEM

Filed April 3, 1957 17 Sheets-Sheet 16

INVENTORS
John E. Ostline
Swan W. Benson
Maurice H. Esperseth
BY
C. A. Gulbrandsen
Atty.

AUTOMATIC TOLL TICKETING TELEPHONE SYSTEM

INVENTORS
John E. Ostline
Swan W. Benson
Maurice H. Esperseth
BY
C. A. Gulbrandsen
Atty.

United States Patent Office 2,955,163

Patented Oct. 4, 1960

2,955,163

AUTOMATIC TOLL TICKETING TELEPHONE SYSTEM

John E. Ostline, Chicago, Swan W. Benson, Rolling Meadows, and Maurice H. Esperseth, Chicago, Ill., assignors to General Telephone Laboratories, Incorporated, Chicago, Ill., a corporation of Delaware Filed Apr. 3, 1957, Ser. No. 650,452

5 Claims. (Cl. 179—7.1)

Figure 1:
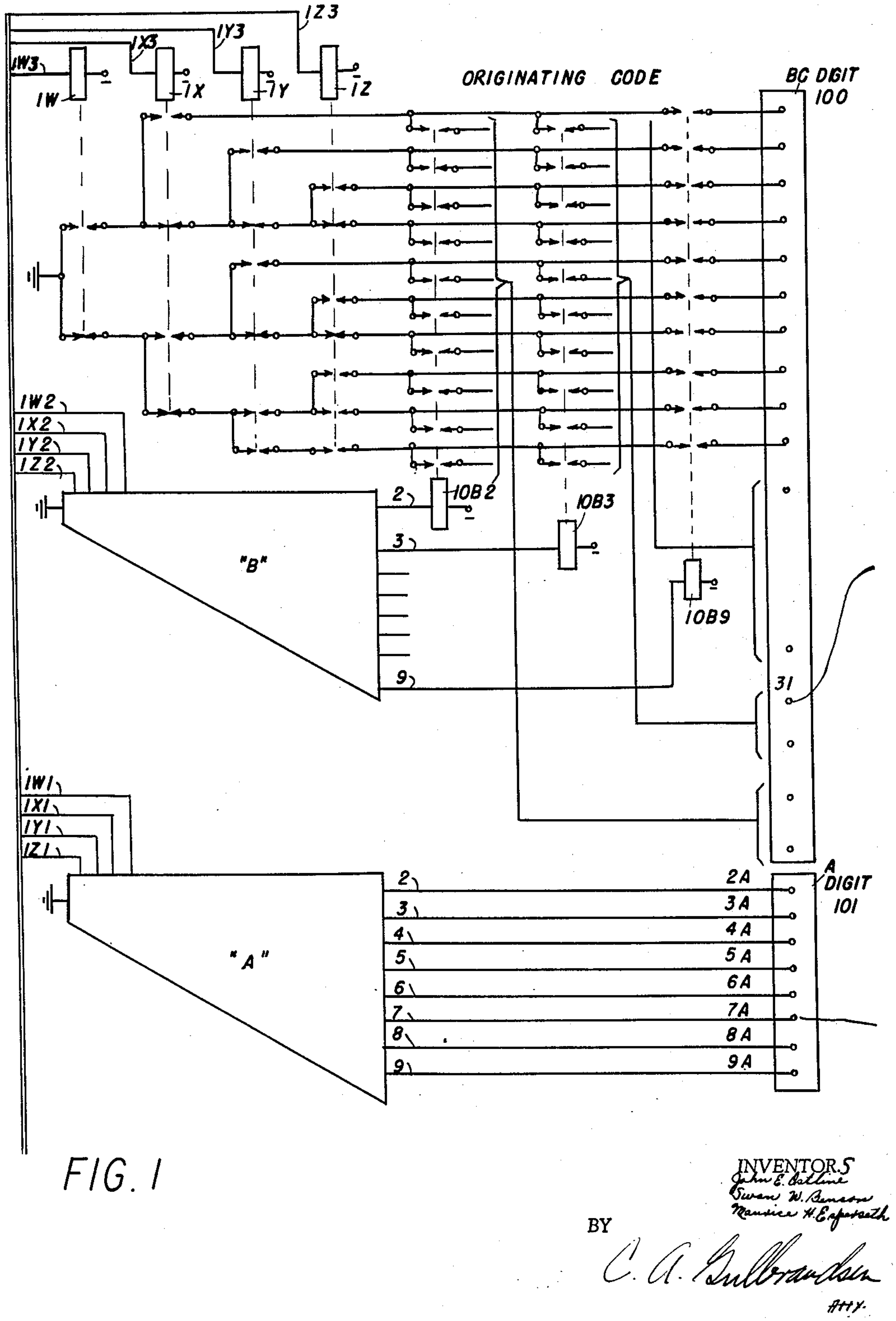
Figure 2:
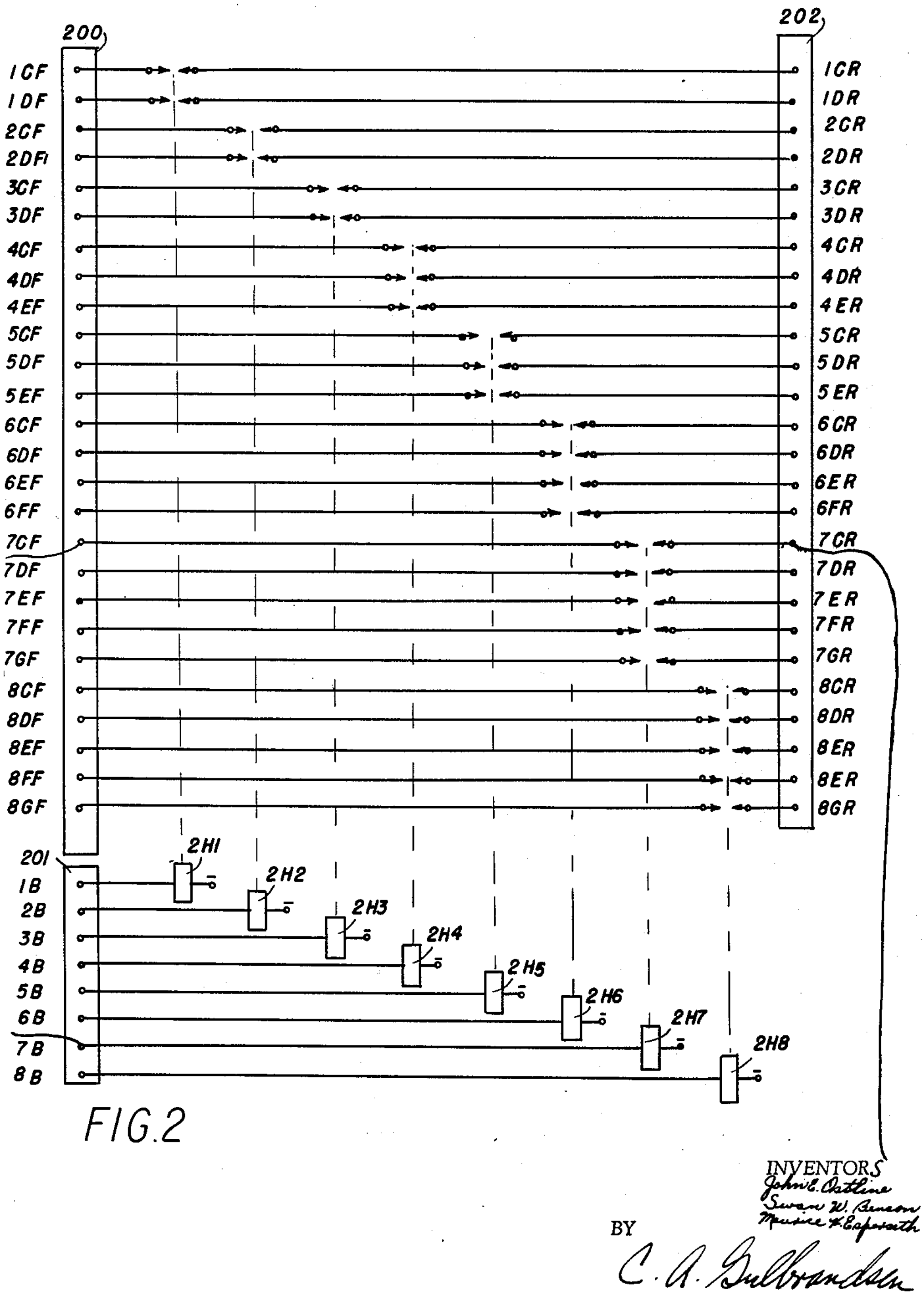

The present invention relates to automatic telephone systems and more particularly to automatic recording and computing apparatus operative to record given particulars and to compute other particulars relative to certain calls in the system. More particularly, the present invention relates to improvements in telephone systems of the character disclosed in the copending application of J. E. Ostline, Serial No. 625,773, filed December 3, 1956, and for use in a telephone system of the character disclosed in the copending application of J. E. Ostline and J. W. Taugner, Serial No. 650,508 filed April 3, 1957.

In a telephone system serving a large area, the area is usually divided into a plurality of zones and calls between the exchanges in different zones and between certain of the exchanges in the same zones are processed as toll calls, for which charges are made, depending upon the distance between zones or the distances between the exchanges in the same zones, and the time duration of the call.

In an automatic toll ticketing system of the type disclosed in the above mentioned Ostline and Taugner application, the area served by the telephone system is divided into a plurality of zones and each zone includes one or more telephone exchanges. Telephone connections established between the subscribers in the different exchanges in the different zones and between the subscribers in different exchanges in the same zone are handled on a toll basis so that the charges for the connections may be assessed against the calling subscriber substations in accordance with the distance between the originating and terminating exchanges and the time duration of the completed telephone connection. Each telephone connection is established automatically under control of a calling subscriber dial and a record is produced of the particulars concerning the connections, including the office code digits identifying both the calling and the called exchanges, the numerical digits identifying both the calling and the called subscriber substations, and other pertinent particulars, such as the rate of charge applicable to the connection, the duration thereof, the date, and possibly the toll charge for the connection.

In the automatic toll ticketing telephone system of the type disclosed in the above mentioned Ostline and Taugner application, the operation is started with the subscriber dialling a toll access code to access the toll ticketing equipment. After which an idle ticketer is associated with the calling line. In response to the dialling of the last digit of the toll access code which must always be a "0," the calling station's directory number is detected and recorded in the ticketer. Then the dialling of the called zone and called exchange digits, of a call to a toll zone, a transender in the exchange will register these dialled digits and will then cause an idle translator to be associated with the transender. The remaining digits of the called subscriber number, dialled by the calling subscriber, will be registered in the ticketer. The transender will then transmit switch setting impulses corresponding either to the value of the digits registered therein or to a translation of a certain portion of the registered digits, followed by impulses corresponding to the value of the remaining registered digits depending upon the routing path over which the connection is to be completed to the called exchanged. A translation is usually made of the first three digits registered in a transender whereby one or more routing digits may be transmitted by the transender for the purpose of setting up the connection. Facilities are also provided in the transender and ticketer for transmitting, as registered, one or more of the first three registered digits and each of the four remaining registered digits of the called subscriber number.

During the setting up of a connection to the called subscriber line under the control of the transender and ticketer, the ticketer will remain in the circuit for the purpose of registering and storing various items of record information which are temporarily registered therein. The information registered therein includes the calling subscriber number, the called office code digits and the called subscriber number, involved in the connection. As soon as a connection is completed between the calling and the called subscriber, the ticketer will time the call and in response to the release of the connection, the ticketer will have registered therein the above-mentioned items of information plus the duration of the call. Following the release of the connection, the ticketer will cause a tabulator to be associated therewith and it will transfer all of the items of information as noted above, including the identity of the ticketer to the tabulator. The tabulator will control a tape perforator to produce a record of the completed call. The tape perforator will record the month, day, hour and minute of the time of termination of the call, the complete directory number of the calling line and the called line, the time duration of the call, the rate applicable to the call and with the aid of the computer the total charge for the call.

Accordingly, it is the main object of the present invention to provide an automatic toll ticketing telephone system for use in relatively small exchanges, which is economical to manufacture and install, and which provides the necessary facilities for producing a permanent and complete record of each toll connection.

It is still another object of the present invention to provide in an automatic toll ticketing telephone system of the type noted, improved circuits and apparatus for determining the charge applicable to each of the calls.

It is still another object of the present invention to provide in an automatic toll ticketing telephone system of the type noted, improved circuits and apparatus for computing the total change applicable to each of the calls.

It is still another object of the present invention to provide in an automatic toll ticketing telephone system of the type noted, improved circuits and apparatus for computing the total charge applicable to each of the calls on a point to point basis even if the calls originate in exchanges other than the central exchange.

Further objects and features of the invention pertain to the particular arrangement of the circuit elements and the apparatus of the automatic ticketing telephone system whereby the above outlined objects and additional operating features are obtained.

Figure 17:
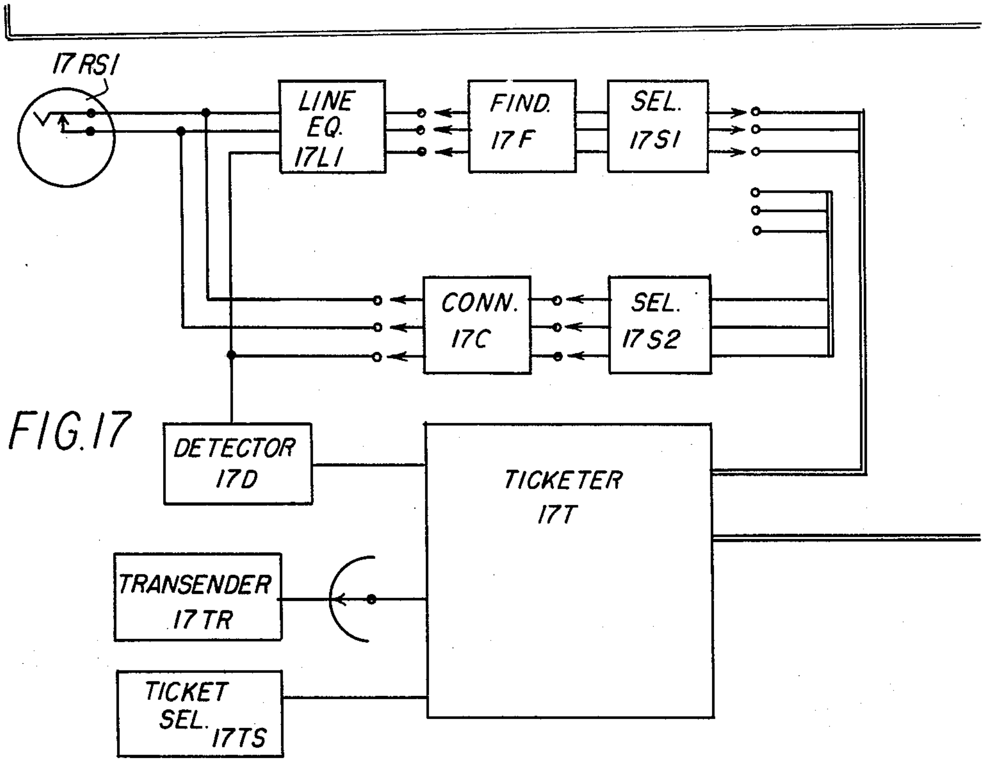
Figure 18:
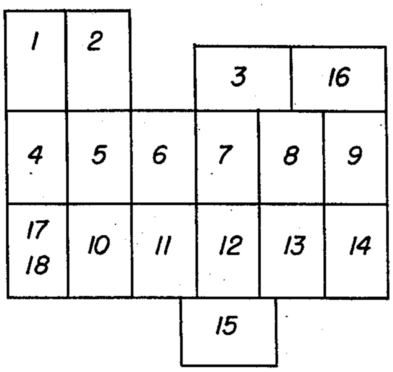

The invention both as to its organization and method of operation, together with further objects and advantages thereof, will best be understood by reference to the following specification taken in connection with the accompanying drawings in which Figs. 1 to 17 inclusive illustrate the necessary details of the invention and Fig. 18 illustrates the manner of combining Figs. 1 to 17 and 18 inclusive, of the drawings to form a unified system, and to illustrate the apparatus incorporating the features briefly outlined above.

Referring now to Figs. 1 to 9, inclusive, it will be seen that the apparatus disclosed therein, comprises in schematic form the details of the computer circuit.

This computer circuit as shown is capable of computing the toll charges up to a maximum of $9.95 for toll calls of 49 minutes or less conversation time. It will register the originating code, destination code and conversation time in CODEL code and translate each into a single marking. The three individual markings are then combined into a (rate) (time) product to operate a toll charge relay. Night and day rates can be processed, and the strapping can be arranged so that the various originating codes may be assigned specific rate time charges for each toll call. This computer will also provide separate markings to the tabulator when the charge exceeds $9.95, when the conversation time exceeds 49 minutes and when an unassigned code is used.

Figs. 10 to 15 inclusive disclose in schematic form the details for the tabulator circuit. This circuit's function is to forward toll call ticketing data to tape perforators. The toll call ticketing data consists of information received from the ticketer, the data timer, the computer, and from the tabulator itself.

The information received from the ticketers consists of the ticketer identity number (three digits), conversation time (three digits), called number (seven, eight, ten or eleven digits) calling number (seven digits), a possible change in rates during the call. The information received from the dater timer consists of the calender date (day and month), the time of day (hours and minutes), and a day or night rate indication. The dater timer is directly connected to the tabulator. The information received from the computer consists of a three digit cost of call indication up to $9.95. The information connected directly within the tabulator is the tabulator identity (two digits).

The ticketing information is normally fed to the tape perforators in reverse numerical order (i.e., units-tens-hundreds-thousands digits rather than thousands-hundreds-tens-units). This facilitates further processing of the punched tape roll in the proper sequence without rewinding the tape roll.

All data received from the ticketer is stored on relays in the tabulator prior to being forwarded to the tape perforator.

The tabulator provides for access to as many as fifty ticketers. Under control of the tabulator allotter, it will hunt for and find a ticketer calling for a tabulator.

The tabulator is arranged for rearranging the sequence of the ticketing information to the perforator according to individual customer requirements.

Figure 16:
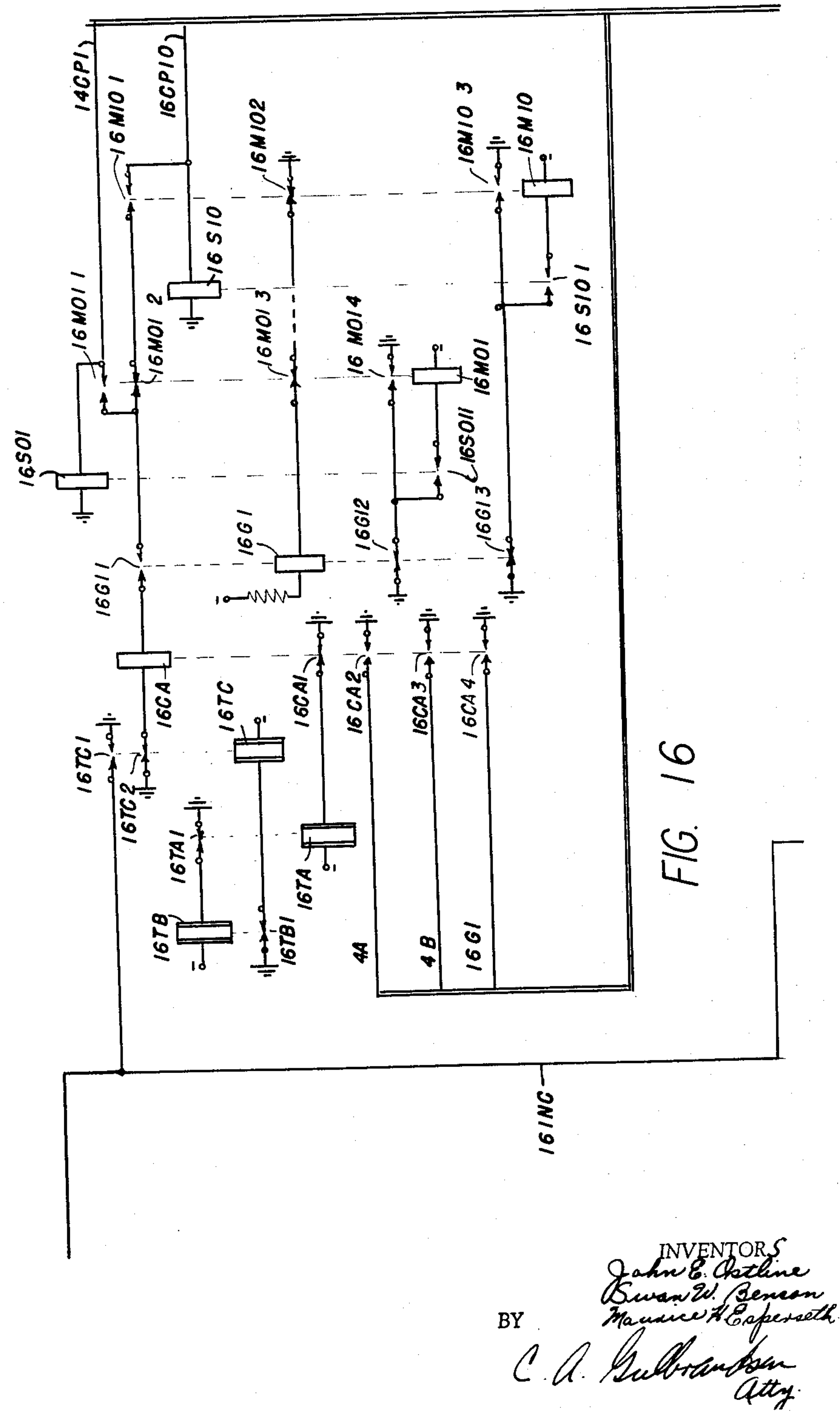

Fig. 16 of the drawing discloses schematically the details of computer allotter. This circuit's function is to allot the computer to a tabulator circuit requesting computer service.

Fig. 17 of the drawing discloses schematically in block diagram form some of the switching equipment of the exchange and also a portion of the toll ticketing equipment.

Fig. 18 of the drawing illustrates the manner of combining the illustrations to form a unified system.

DETAILED OPERATION

*Seizure from local selector*

When a calling subscriber at station 17RS1 removes his receiver, the usual loop circuit, including the line conductors is completed for operating the line circuit 17L1. In response to the completion of the above mentioned loop circuit, the line circuit 17L1 initiates operation of the distributor and marks the terminals of the calling subscriber line in the bank contacts of a group of line finders, including the line finder 17F, having access to the calling subscriber line. For the purpose of this description it will be assumed that the distributor selects the line finder 17F and that the latter finder operates its wiper in a vertical and then in a rotary direction in the well-known manner to select the terminals in the associated bank terminating the calling line. When the calling line is found by the line finder 17F, it extends the calling line to the individually associated first selector 17S1 and the latter selector transmits the usual dial tone signal to the calling subscriber to indicate that the dialling may be started. The above noted switching apparatus, including the line circuit 17L1, the distributor, the line finder 17F and the first selector 17S1 may be of conventional construction and arrangement and may be, for example, of the type illustrated in the Bakker Patent No. 2,289,896, granted July 14, 1942, and in the Saunders Patent No. 1,849,694, granted March 15, 1932.

Since the calling subscriber intends to extend the connection to a called subscriber in a remote exchange it is necessary to prefix the three digit directory number of the called subscriber with the access code digits "90." Consequently, when the calling subscriber receives the dialling tone signal the dial is actuated in accordance with the digit 9 to transmit nine loop impulses to the first selector 17S1. This selector then raises its wipers in a vertical direction to the ninth level and then rotates its wipers over the selected level to search for an idle ticketer, such as the ticketer 17T. It will be assumed for the purpose of this description that the first selector 17S1 now extends the connection from the calling subscriber line to the ticketer 17T. The "−" conductor, the "+" conductor and the control conductor are included in this connection. If the ticketer is busy, the control conductor will be grounded in order to indicate the busy condition to the first selector 17S1. Thus, as the selector rotates its wipers over the ninth level it will pass over contacts terminating ticketers having grounded control conductors corresponding to the C conductor.

*Seizure of ticketer*

When the first selector 17S1 seizes the ticketer it extends the loop circuit, including the "−" and "+" conductors of the calling line to the ticketer. This circuit on locally originated calls, is seized from a local selector. It can handle both: (1) Seven digit toll calls consisting of the ABC office code and four terminal numbers and (2) ten or eleven digit toll calls into a foreign area consisting of a three digit area code, the ABC office code, and four or five terminal numbers.

On locally originated calls, the party identification digit "0" is the first digit dialled into this circuit.

The principal functions of the ticketer are as follows:

(*a*) It tests the insulation resistance of the calling line to ground to prevent incorrect party identification on locally originating calls.

(*b*) It calls for a transender when seized.

(*c*) On locally originating calls, it determines the party identity and calls for a detection of the calling party's number after the party identification digit "0" has been dialled.

(*d*) It repeats to the transender the office code digits on seven digit calls, and the area code plus the office code digits (if needed) on ten or eleven digit calls.

(*e*) It times the length of conversation from the time the called party answers until the calling party disconnects.

(*f*) It stores the following ticketing information during conversation: the calling number (5 digits only); the called number (7, 10, or 11 digits); and a change in toll rates indication, if it occurs during the call.

(*g*) After the calling party has disconnected, it calls for a tabulator and transfers to it the ticketing information. During this transfer operation, the ticketer is guarded against seizure from another call, but the calling line and the outgoing trunk are released. The ticketer releases after transfer is completed. A detailed explanation of the ticketer operation may be found in the copending Ostline, Taugner application, Serial No. 650,508 filed April 3, 1957.

*Seizure*

Upon completion of a call, the ticketer calls for a tabulator through the tabulator allotter. Resistance ground (2000 ohms) on lead 11KSL marks this switch idle. When the tabulator allotter encounters this switch, battery through the rotary switch magnet of the tabulator allotter closes the circuit via lead 11KSL to relay 11KS. Relay 11KS operates, closes the circuit to magnet 10TF from ground encountered on level B bank terminal N of switch 10TF, and shorts the number two winding of relay 10KA.

Magnet 10TF operates, operates its Int. springs 10TF1 which open the circuit to the magnet. Magnet 10TF restores and advances its wipers one step (bank terminal 1). Magnet 10TF is now connected to lead 10H1 via its Int. springs 10TF1. Idle ticketers and such not requiring a tabulator maintain ground on their respective leads H corresponding to lead 10H1. This ground on lead 10H1 maintains the short on the number two winding of 10KA, thus preventing its operation and completes the circuit to magnet 10TF. Switch 10TF steps self-interrupted from ground encountered on lead 10H1 until it reaches the bank terminals associated with a ticketer requiring a tabulator. Lead 10H1 of this position is open, thus removing the short from the number two winding of relay 10KA. Relay 10KA operates in series with magnet 10TF (magnet 10TF does not operate on this circuit), opens lead 10H1, opens lead 11TBL, closes 10KF, and closes 11KC. Relay 11KC is slow-to-operate and does not operate immediately. Relay 10KF operates, prepares a circuit at contacts 10KF1 to relay 12KT to prepare the digit supervisory alarm circuit described in section and closes a "continuity check" circuit from the number one winding of relay 10KB to ground through the winding of a relay in the ticketer. This continuity check circuit traces back and forth between the ticketer and the tabulator as described in the section on continuity checking and serves to prevent further tabulator and ticketer operation when signal leads between these circuits are open or when certain relays and rotary switches are not operated. If the "continuity check" circuit is satisfactory, relay 10KB operates, locks at contacts 10KA4 through its #2 winding in series with the number two winding of relay 10KA, opens part of the operating circuit to the number one winding of relay 11KD, thus preventing its later operation when relay 11KC operates, and closes a multiple circuit from the number one winding of relay 10KB to the ticketer P leads on switch 10R, thus shorting resistor 10R5 (2000 ohm) and the various levels of switches 19TF and 10R. Relay 9GA in the ticketer operates and transfers lead P from said relay to the magnet of a send switch in the ticketer relay 11KC operates, prepares the circuit for 13MA, prepares the holding path for 14CS, shorts 11KS by grounded lead 11KSL at contacts 11KC7, closes the number two winding of relay 12PC to lead 12TSC to the perforator, closes 10PA at contacts 12PC1 to the multipled level. A bank terminal of switch 10R, and closes a locking ground for the CODEL and other storage relays. Direct ground on lead 11KSL marks this circuit busy to the tabulator allotter. Relay 11KS restores, opens the number two winding of relay 10KA (relay 10KA remains operated on its #1 winding in series with the number two winding of relay 10KB, closes ground via the level A wipers of switch 10R which are engaged on bank terminal 1 to the #1 and #2 windings of 10PA.

*Transfer of ticketing information from ticketer to tabulator*

The transfer of ticketing information is controlled by switch 10R which simultaneously connects leads W, X, Y and Z from the ticketer to the various CODELS in the tabulator. This receiving switch 10R steps in unison with the send switch in the ticketer. The rate of stepping is controlled by pulse-generating relay 10PA in the tabulator. Relay 10PA operates in the following manner. At normal, condenser 10C5 stands charged to battery through the two windings of relay 10PA which are connected in series aiding. Ground closed by the level A wipers of switch 10R is connected to relay 10PA through its contacts 10PA3. This ground short circuits the condensers through the #1 winding of relay 10PA and energizes the #2 winding of this relay. The resulting condenser discharge current through the #1 winding of relay 10PA opposes the effect of the current in the #2 winding and delays the operation of this relay until the condensers are almost completely discharged. When relay 10PA finally operates, it opens ground at contacts 10PA3 thus opening the discharging circuit to the condensers. The condensers immediately start recharging from battery through the #2 and #1 windings of relay 10PA. This condenser charging current flows through both windings aiding and causes relay 10PA to remain operated until the current decreases sufficiently as the condensers become fully charged. Relay 10PA finally releases and the cycle repeats itself. This circuit arrangement makes relay 10PA both slow-to-operate and slow-to-release. The cycling rate is very stable and depends upon the residual adjustment and margining of relay 10PA and the capacity of the condensers. Varying the capacitance will vary the pulse speed.

Each operation of relay 10PA closes a pulse to magnet 10R and closes a pulse over lead 10P1 to the ticketer. These pulses are in unison and step switch 10R in this circuit and the send switch in the ticketer in synchronism. A send switch in the ticketer and switch 10R in this circuit advance one step per pulse. After the first pulse, any grounds encountered by the wipers of the send switch will be extended over leads W, X, Y, and Z thru banks EF to LM of switch 10TF to the wipers of levels B, C, D and E of switch 10R and then to the CODEL relays connected to the first bank terminals. Each additional step of the two switches will connect the W, X, Y, Z leads to another CODEL group, and thus transfer to these CODEL relays the data in the ticketer pertaining to the call. All CODEL relays that operate lock to ground from relay 11KC.

The information which is transferred to the tabulator varies with short and long haul calls since long haul calls have an additional three digit area code. The sequence in which the information is transferred to and stored in the tabulator is as follows:

FOR LONG AND SHORT HAUL CALLS

Bank Terminals 2:
- Short haul called number "A" digit (CODEL 21)
- Long haul called number 1st area digit (CODEL 21)

Bank Terminals 3:
- Short haul called number "B" digit (CODEL 22)
- Long haul called number 2nd area digit (CODEL 22)

Bank Terminals 4:
- Short haul called number "C" digit (CODEL 23)
- Long haul called number 3rd area digit (CODEL 23)

Bank Terminals 5:
- Long haul only called number "A" digit (CODEL 24)

Bank Terminals 6:
- Long haul only called number "B" digit (CODEL 25)

Bank Terminals 7:
- Long haul only called number "C" digit (CODEL 26)

Bank terminals 8:
- Calling Number "A" digit (CODEL 1)

Bank Terminals 9:
- Calling Number "B" digit (CODEL 2)

Bank Terminals 10:
- Calling Number "C" digit (CODEL 3)

Bank Terminals 11:
- Conversation time Hundreds digit (minutes) (CODEL 32)

Bank Terminals 12:
- Conversation time Tens digit (minutes) (CODEL 33)

Bank Terminals 13:
- Conversation time Units digit (minutes) (CODEL 34)

Bank Terminals 14:
- LevelB—Short haul (absence of ground) Long haul (ground)
- Level C—Ticketer Identity Hundreds digit (relay 11X8)
- Level D—Ground indicates a change of toll rates during call (relay 13TR)
- Level E—Ground provides a computer start indication Bank Terminals 15: Ticketer Identity ---------- Tens digit (CODEL 9)

| | |
|---|---|
| Bank Terminals 16: Ticketer Identity | Units digit (CODEL 10) |
| Bank Terminals 17: Called Number | 1st Terminal digit (CODEL 27) |
| Bank Terminals 18: Called Number | 2nd Terminal digit (CODEL 28) |
| Bank Terminals 19: Called Number | 3rd Terminal digit (CODEL 29) |
| Bank Terminals 20: Called Number | 4th Terminal digit (CODEL 30) |
| Bank Terminals 21: Called Number | (Eight or eleven digit calls only) 5th Terminal digit (CODEL 31) |
| Bank Terminals 22: Calling Number | 1st Terminal digit (CODEL 4) |
| Bank Terminals 23: Calling Number | 2nd Terminal digit (CODEL 5) |
| Bank Terminals 24: Calling Number | 3rd Terminal digit (CODEL 6) |
| Bank Terminals 25: Calling Number | 4th Terminal digit (CODEL 7) |

Most of the foregoing information is merely stored on CODEL relays in the tabulator for latter transmission to the perforator and has no effect on the operation of the tabulator. However, when the wipers of switch 10R encounter the 14th bank terminals, the following operations occur if ground appeared on the various levels:

Level B—Absence of ground indicates a short haul call (seven or eight digits) and no operations occur. Ground indicates a long haul call (ten or eleven digits) and closes a circuit to 12LH. Relay 12LH operates, locks, and closes the circuit to relay 15LA. Relay 15LA operates and closes CODELS 21 through 26 to leads W21 through Z26, respectively, of a terminal block.

Level C—The ticketer identity hundreds digit is indicated on this level. If no ground is encountered, relay 11X8 does not operate and ground remains on lead Z8 of terminal block 15D. If ground is encountered, 11X8 operates, locks at 11KC and closes ground to leads W8 and X8 of a terminal block.

Level D—Ground on this level indicates a change of toll rates during a call. Relay 13TR operates upon ground encountered on this level, locks at 11KC, transfers lead 13DR from 15DRT to 15NRT, transfers lead 13NR from 15NRT to 15DRT, and closes ground to contacts 14CC11 (lead 14TR).

Level E—Ground on this level closes the circuit to relay 14CS. Relay 14CS operates. Further operation is as described in the succeeding section.

If the call is an eight or eleven digit call, various CODEL relays in CODEL 31 operate when switch 10R advances to bank terminal 21 and closes a multiple circuit to relay 11PL. Relay 11PL operates, removes ground from leads 11W31, 11X31 and 11Z31, closes CODEL 31 to the 11W31, 11X31, 11Y31 and 11Z31 leads on terminal block 15D and opens at contacts 11PL1 lead 15S from the number one winding of relay 12KT. As the level A wiper of switch 10R steps from bank terminal 25 to N, the circuit is opened to pulsing relay 10PA and ground is closed to contacts 14CS2 of the computer access circuit.

*Computer access*

As relay 14CS operates from ground closed to level E bank terminal 14 of switch 10R, as described in the preceding section, it locks to ground at contacts 11KC5, and closes relay 14CB at contacts 14CS4 to the computer. Operation in the computer then causes low resistance ground to be closed to lead 14CP1. Relay 14CB operates, closes 10BR, and closes a circuit at contacts 14CB2 to relay 14CC. Relay 14CC operates and closes leads 14TR, 14INC, and 14W51 through 14Z53 to the computer. Bar relay 10BR operates and closes CODELS 1, 2, 3, 21, 22, 23, 32, 33 and 34 to the computer. If relay 13TR had previously operated, ground appears on contacts 14CC11. This ground closed via lead 14TR indicates to the computer that rates have changed during the call and that the previous rates should be used.

If operation in the computer is normal, it will then close grounds to various 14W51 through 14Z53 leads to indicate the charge for the call. The charge is expressed in CODEL code.

CODEL 51 indicates the dollars digit, CODEL 52 indicates the ten cent digit and CODEL 53 (X53 and Z53) indicates the cents digit, which can only be the digits "0" or "5." Thus the total charge may be any 5 cent interval from $0 to $9.95. The various CODEL relays in CODEL 51, 52, and 53 operate, lock to 11KC9 and close ground to the various W51 to Z53 leads on a terminal block. It should be noted that regardless of the cost of the call, CODEL Z53 will operate and lock. When CODEL Z53 operates, it closes ground at contacts 14Z53-1 from 11KC5 to 12KE, and opens lead 14CP1 to release the computer. Relay 14CB restores and opens relay 14CC. Relay 14CC restores, opens leads 14TR, 14INC, and 14W51 through 14Z53. Relay 12KE operates and further operation is as described in the succeeding section. If an irregularity occurs in the computer (i.e. cost of call more than $9.95), no grounds appear on leads 14W51 to 14Z53. After a slight interval, ground is closed via lead 14INC to 14CE. Relay 14CE operates, locks, closes ground to 12KE, opens lead 14CP1, closes ground to leads 14W51, 14X51 and 14Z51, opens 14CB and closes lead 14INC on terminal block D to the number one winding of relay 12KT. Relays 14CB and 14CC restore.

*Seizing perforator*

This circuit is used in conjunction with a tabulator finder and perforator allotter. When relay 12KE operates as described in the preceding section the action is as follows: If the call is a short haul call, relay 12LH is not operated and relay 12KE closes a circuit at contacts 12KE1 to relay 15SA. In operating, relay 15SA closes CODELS 21, 22 and 23 to leads W24 through Z26, respectively, on terminal block D, and ground via lead 14 to MS; closes a multiple locking path for 15SA to ground at contacts 11KC9; removes ground from contacts 13MSL and closes ground to contacts 13MS3; closes lead 15S21 to lead 15AC, and closes leads W21, X21, and Z21 to terminal 15ACS. Relay 13MS operates, closes ground on contacts 13MS3 to short haul tabulator finder and perforator allotter circuit via lead 13ST1 and removes ground from lead 13P1, to mark this circuit as a calling tabulator to the tabulator finder. (Ground remains on 13P2 from contacts of 12LH in the tabulator.) When the tabulator finder encounters this circuit, resistance battery is closed to lead 13H. Relay 13MA operates and opens 13MS. Relay 13MS restores, closes ground to lead 13P1 and removes ground from lead 13ST1. Further operation in the tabulator finder circuit then closes lead 13TF through 15TZ to the perforator.

If the call is a long haul call, relay 12LH is already operated and relay 12KE closes a circuit to relay 13MS contacts 12KE2. Relay 13MS operates, closes ground at contacts 13MS1 to the long haul tabulator finder and perforator allotter circuit via lead 13ST2 and removes ground from lead 13P2. As in the case of a short haul call, relay 13MA operates when the tabulator finder encounters this circuit and opens 13MS. Relay 13MS restores, closes ground to lead 13P2 and removes ground from lead 13ST1. Further operation in the tabulator finder circuit starts the perforator and closes lead 13TF through 15TZ to the perforator.

*Perforation of ticket tapes*

The operation of punching the tapes being after switch-through to a perforator. At this time, ground pulses are encountered on lead 12TSC from the perforator. The first pulse closes the circuit to the number two winding to relay 12PC. Relay 12PC operates its "X" contacts 12PC1 only, which short the number one winding of relay 12PC. After the pulse, the short is removed and relay 12PC operates fully on both its windings in series, closing the pulsing circuit from lead 12TSC to relay 12PB. Relay 12PB follows the pulses on lead 12TSC and each time closes ground to lead 13TF (tape feed) and to magnet 15S and closes resistance 10R4 battery to the digit supervisory alarm network of relays 15W, 15X, 15Y and 15Z.

Switch 15S advances its wipers and they scan their respective bank terminals. As various grounds are encountered on the level CD through JK wipers, the respective 15W, 15X, 15Y and 15Z relays operate and close grounds via their corresponding 15TW, 15TX, 15TY and 15TZ leads to the associated punch magnets in the perforator. As relay 12PB restores after each pulse, switch 15S advances its wipers to the next contact and immediately positions relays 15W, 15X, 15Y and 15Z for the next digit. The AB level of switch 15S functions as a control of the tabulator and the perforator during the perforation of the tape. The various control leads on terminal block D which may be strapped to leads A1 through A50 and their resulting operations are as follows:

Terminal 15S: This terminal is normally used when no normal digit is to be punched corresponding to a specific position of switch 15S for all calls. Ground closed to this terminal from the level AB wiper shorts the number one winding of relay 12KT, thus disabling the digit supervisory alarm.

Terminal 15S21: This terminal is normally associated with the bank terminals of switch 15S on which the area code appears for long haul calls. For short haul calls no area code appears on these bank terminals, and ground from the level AB wiper is closed to lead 15AC.

Terminal 15AC: This terminal, on short haul calls, in conjunction with terminal 15ACS provides either (1) to disable the digit supervisory alarm and send a skip indication where the area code digits would normally appear; or (2) suppress the area code channels completely from the tape.

Terminal 15ACS: This terminal is connected to ground when a skip mark is desired for the area code blanks on short haul calls or is left ungrounded when the area code spaces are to be suppressed from the tape.

Terminal 15S31: This terminal is normally associated with the bank terminals of switch 15S on which the eighth or eleventh digit appears for eight or eleven digit calls. For seven or ten digit calls, no normal digit appears on these bank terminals and ground from the level AB wiper shorts the number one winding of relay 12KT, thus disabling the digit supervisory alarm.

Terminal 15PD: This terminal allows switch 15S to advance without advancing the tape in the perforator. Ground closed to this terminal from the level AB wiper closes a circuit to relay 13PD. Relay 13PD operates, opens resistance 10R4 battery, preventing relay 12KT from operating, and opens lead 13TF, thus preventing the Perforator from advancing the tape.

Terminal 15KG: This terminal is normally associated with the bank terminals of switch 15S on which the information from the dater-timer appears. Ground closed to this terminal from the level AB wiper closes a circuit to relay 13KG. Relay 13KG operates, closes ground to lead 13GUARD to prevent the dater-timer for changing time during register of this information.

Terminal 15KR: This terminal initiates the Tabulator release after all the ticket information has been transferred to the tape. Ground closed to this terminal from the level AB wiper of switch 15S closes the circuit to relay 15KR. Further operation is described in section 7.

Terminal 14INC: This terminal is normally associated with the bank terminals of switch 15S on which the toll charge appears. If the toll charge exceeds the computer limit ($9.95), lead 14INC on terminal block D is closed to the number one winding of relay 12KT. Ground closed to this terminal from the level AB wiper of switch 15S shorts the number one winding of relay 12KT, thus disabling the digit supervisory alarm.

In addition to the call information, it is necessary to provide information on the tape to control the equipment which will be used in reading the perforated tape. This information consists of skip indications and a start of message indication. The skip indication consists of punched W, X and Z channels and the start of message indication consists of punched W, X, Y and Z channels. The skip indication notifies the tape reading equipment to skip that digit plus the two succeeding blanks. The skip indication will appear on CODEL marking lead W21, X21, and Z21 for short haul calls, W31, X31 and Z31 for seven or ten digit calls, and W51, X51 and Z51 for incomplete charge calls. If the first three digits are to be suppressed on a short haul call, the skip indication will not appear on leads W21, X21 and Z21.

For purposes of explanation, assume a typical sequence of strapping and perforating to be as follows:

| | |
|---|---|
| Bank Terminal 1: | |
| Long haul call | 3rd Area Code digit (CODEL 23) |
| Short haul call | No information—tape may or may not be advanced |
| Bank Terminal 2: | |
| Long haul call | 2nd Area Code digit (CODEL 22) |
| Short haul call | No information—tape may or may not be advanced. |
| Bank Terminal 3: | |
| Long haul call | 1st Area Code digit (CODEL 21) |
| Short haul call | Skip Mark (W21, X21, Z21) or, no information—tape not advanced |
| Bank Terminal 4: Toll charge | Units digit (CODEL 53) |
| Bank Terminal 5: Toll charge | Tens digit (CODEL 52) |
| Bank Terminal 6: Toll charge | Hundreds digit (CODEL 51) |
| Bank Terminal 7: Toll charge | Skip Mark (W, X, Z) |
| Bank Terminal 8: Conversation time | Units digit (CODEL 34) |
| Bank Terminal 9: Conversation time | Tens digit (CODEL 33) |
| Bank Terminal 10: Conversation time | Hundreds digit (CODEL 32) |
| Bank Terminal 11: | |
| Eight or eleven digit call Called number | 5th terminal digit (CODEL 31) |
| Seven or ten digit call | Skip Mark (W31, X31, Z31) |
| Bank Terminal 12: Called number | 4th terminal digit (CODEL 30) |
| Bank Terminal 13: Called number | 3rd terminal digit (CODEL 29) |
| Bank Terminal 14: Called number | 2nd terminal digit (CODEL 28) |
| Bank Terminal 15: Called number | 1st terminal digit (CODEL 27) |
| Bank Terminal 16: Called number | Office code "C" digit (CODEL 26) |
| Bank Terminal 17: Called number | Office code "B" digit (CODEL 25) |
| Bank Terminal 18: Called number | Office code "A" digit (CODEL 24) |
| Bank Terminal 19: Calling number | 4th terminal digit (CODEL 7) |
| Bank Terminal 20: Calling number | 3rd terminal digit (CODEL 6) |
| Bank Terminal 21: Calling number | 2nd terminal digit (CODEL 5) |
| Bank Terminal 22: Calling number | 1st terminal digit (CODEL 4) |
| Bank Terminal 23: Calling number | Office code "C" digit (CODEL 3) |
| Bank Terminal 24: Calling number | Office code "B" digit (CODEL 2) |
| Bank Terminal 25: Calling number | Office code "A" digit (CODEL 1) |
| Bank Terminal 26: Time of day | Units digit (minutes) (W48, X48, Y48, Z48) |
| Bank Terminal 27: Time of day | Tens digit (minutes) (W47, X47, Y47, Z47) |
| Bank Terminal 28: Time of day | Units digit (hours) (W46, X46, Y46, Z46) |
| Bank Terminal 29: Time of day | Tens digit (hours) (W45, X45, Y45, Z45) |
| Bank Terminal 30: Calendar day | Units digit (W44, X44, Y44, Z44) |
| Bank Terminal 31: Calendar day | Tens digit (W43, X43, Y43, Z43) |
| Bank Terminal 32: Calendar month | Units digit (W42, X42, Y42, Z42) |
| Bank Terminal 33: Calendar month | Tens digit (W41, X41, Y41, Z41) |
| Bank Terminal 34: Tabulator identity | Units digit (W50, X50, Y50, Z50) |
| Bank Terminal 35: Tabulator identity | Tens digit (W40, X40, Y40, Z40) |
| Bank Terminal 36: Ticketer identity | Units digit (W10, X10, Y10, Z10) |
| Bank Terminal 37: Ticketer identity | Tens digit (W9, X9, Y9, Z9) |
| Bank Terminal 38: Ticketer identity | Hundreds digit (W8, X8, Y8, Z8) |
| Bank Terminal 39: No information, tape not advanced | |
| Bank Terminal 40: Start of Message | (W, X, Y, Z) |

As switch 15S advanced its level A wiper to bank terminal N, relay 13PD operates and opens lead 13TF and opens resistance 10R4 battery. This allows switch 15S to advance its wipers to the next contact without advancing the tape since no information is encountered on this step. Similar operation occurs when the level B wiper of switch 15S encounters bank terminal 39 which is strapped to lead 15PD. As bank terminals 26 through 33 are scanned, relay 13KG operates from ground closed via the level B wipers to terminal block lead 15KG and closes ground to lead B guard.

As switch 15S advances its wipers to bank terminal 41, ground is closed via the level B wiper to relay 11KR to initiate release of the tabulator.

*Continuity check and digit supervisory alarm*

The "continuity check" circuit mentioned in the section titled "Seizure" is a series circuit which traces back and forth between the tabulator and the ticketer and serves to check the continuity of leads 10W1, 10X1, 10Y1, 10Z1, and 10P1 between these circuits and the status of switches and relays for satisfactory ticketer-tabulator operation. The "continuity check" is made when send switch in the ticketer is in position 1 and is as follows:

| Tabulator | Ticketer |
|---|---|
| 1. Battery thru #1 winding of 10KB. | |
| 2. 2000 ohm resistor 10R5. | |
| 3. Contacts 10KF2. | |
| 4. Level B wiper of switch 10R. | |
| 6. Rotary switch 10TF, wiper level EF over 10W1 lead to— | |
| | 7. Rotary send switch, wiper level B. |
| | 8. Rotary send switch, contact 1 level B. |
| | 9. Rotary send switch, contact 1 level C. |
| | 10. Rotary send switch, wiper level C. |
| Back over an 10X1 lead to— | |
| 11. Rotary switch 10TF, wiper level GH. | |
| 12. Rotary switch 10R, wiper level C. | |
| 13. Make combination 10KF3. | |
| 14. Rotary switch 10R, wiper level D. | |
| 15. Rotary switch TF, wiper level JK. | |
| 16. Over a Y lead to— | |
| | 17. Rotary send switch, wiper level D. |
| | 18. Rotary send switch, contact 1 level D. |
| | 19. Rotary send switch, contact 1 level E. |
| | 20. Rotary send switch, wiper level E. |
| | 21. Back over a 10Z1 lead to— |
| 22. Rotary switch 10TF, wiper level LM. | |
| 23. Rotary switch 10R, wiper level E. | |
| 24. Relay 10PA, break combination. | |
| 25. Relay 10KA, preliminary make combination. | |
| 26. Rotary switch 10TF, wiper level CD. | |
| 27. Over a 10P1 lead to— | |
| | 28. Relay break combination. |
| | 29. Winding #1 of said relay. |
| | 30. Ground thru relay 9BD make combination. |

*Note.*—The course of the "continuity check" through the ticketer may be changed with ticketers different from that disclosed in the copending Ostline and Taugner application Serial No. 650,508, filed April 3, 1957. In that case, this explanation may not be correct according to the changes on the Ticketer and the explanation will merely indicate the pattern of the "continuity check" circuit.

When relay 10KA in the tabulator operates upon tabulator seizure, it closes relay 11KC which after a delay closes relay 11KD. Since both relay 11KC and 11KD are slow-to-operate, relays 15KD in the tabulator and a relay in the ticketer operate in series and initiate subsequent tabulator ticketer operation before relay 11KD in the tabulator operates. If the "continuity check" circuit is open, relay 10KB does not operate, relays 11KC and then 11KD operate. Relay 11KD locks to the ground, grounds lead 11KSL to step the tabulator allotter to the next tabulator and to shunt relay 11KS. Relay 11KS releases, opens 10KA. Relay 10KA releases, opens relays 11KC and 10KF. Relays 11KC and 10KF release and the circuit is held idle by relay 11KD but is guarded against re-seizure until the open in the "continuity check" circuit is corected and relay 11KD released.

The digit supervisory alarm functions through the network of contacts on relays W, X, Y and Z. Since the CODEL code consists of one or two markings out of a possible four markings, the circuit to relay 12KT through these relay contacts is arranged to open when one or two relays operate and to close when no relays or three or four relays operate.

The CODEL digit check is normally made each time relay 12PB operates. However, on the first pulse of 12PB when switch 15S is in normal position and on succeeding steps of switch 10S when its level AB wipers encounter lead 15S, and possibly when its level AB wipers encounter leads 15S21, 15S31 and 14INC (depending on types and conditions of call), relay 12KT is shorted and will not operate regardless of the condition of the W, X, Y and Z relays. The circuit also is opened to 12KT whenever relay 12PD operates. If relay 12KT operates because of an incorrect CODEL code, it locks, opens the "continuity check" circuit to 10KB, opens 12KE, opens 12PC which restores and opens the pulsing circuit to 12PB. Relay 12KE restores and opens the circuit to 13MS. The tabulator remains thus operated until relay 10KF is released.

*Release*

When switch 15S has completed the scanning of all data and the wiper of level B advances to lead 15KR, relay 11KR operates locks to ground through the RSON springs of switches 10R and 15S in multiple, opens relays 10KA and 10KB, closes a multiple ground to lead 11KSL, further opens lead 11TBL. Relay 10KB restores and opens 12KE. Relay 10KA restores and opens 10KF and 11KC. Relay 10KF restores. Relay 12KE restores. Relay 11KC restores, releases all CODEL relays and 11PL, opens 12PC, closes the "homing" path to switch 10R through its contacts 10R1 and 10R2, opens 12LH (if operated), opens 15SA (if operated), and opens 13MA and lead 13H. Relay 12LH restores and opens 15LA which, if operated, restores. Relay 12PC restores. Switch 10R advances to terminal 1 and its RSON contacts 10R3 transfer ground to switch 15S. Switch 15S advances to normal, and its contacts 15S2 open 11KR. Relay 11KR restores, replaces ground with 2000 ohm ground on lead 11KSL and closes ground to lead 11TBL.

*Seizure*

The computer is assigned to a waiting tabulator by the tabulator assigner. Each tabulator may gain access to the computer at the end of a conversation by means of its 14CP1 lead. The tabulator assigner gives the tabulators access to the computer one at a time.

Resistance battery over lead 14CP1, for example closes 16SO1. Relay 16SO1 operates and closes 16MO1. Relay 16MO1 operates, locks by its "X" contacts 16MO1–4, opens relay 16G1, and transfers an incomplete circuit of relay 16CA from succeeding SO relays to 16SO1.

Relay 16G1 restores and closes relay 16CA to resistance battery on lead 14CP1. Low resistance relay 16CA causes a battery connected relay in the tabulator to operate. Relay 16SO1 remains operated. The tabulator relay applies the required CODEL information to the W, X, Y and Z leads of Figures 1, 3 and 4 to permit registration of the desired information. The tabulator relay also completes the circuit to the W, X, Y and Z leads of Figure 9 for receiving the total toll charge in CODEL form from the computer.

When relay 16CA operates, ground is closed to the dater timer over lead 16G1, leads 16A and 16B are grounded and slow-to-release relay 16TA is opened.

At the same time ground is applied to the appropriate W, X, Y and Z leads of Figures 1, 3 and 4, as will be discussed in the succeeding section.

After a short delay, relay 16TA restores and opens slow-to-release relay 16TB. After a short delay, 16TB restores and opens slow-to-release 16TC. After a short delay, 16TC restores and transfers ground from relay 16CA to lead 16INC. Under normal operation, relay 16CA should be released by the tabulator before this timing cycle is completed.

Lead 14CP1 is opened by the tabulator upon receipt of the toll charge. The complete function of the computer is accomplished during the time low resistance ground is placed on lead 16CP1 by the coil of relay 16CA.

REGISTRATION

*Registration of called office or called area 3-digit code*

Figure 4:
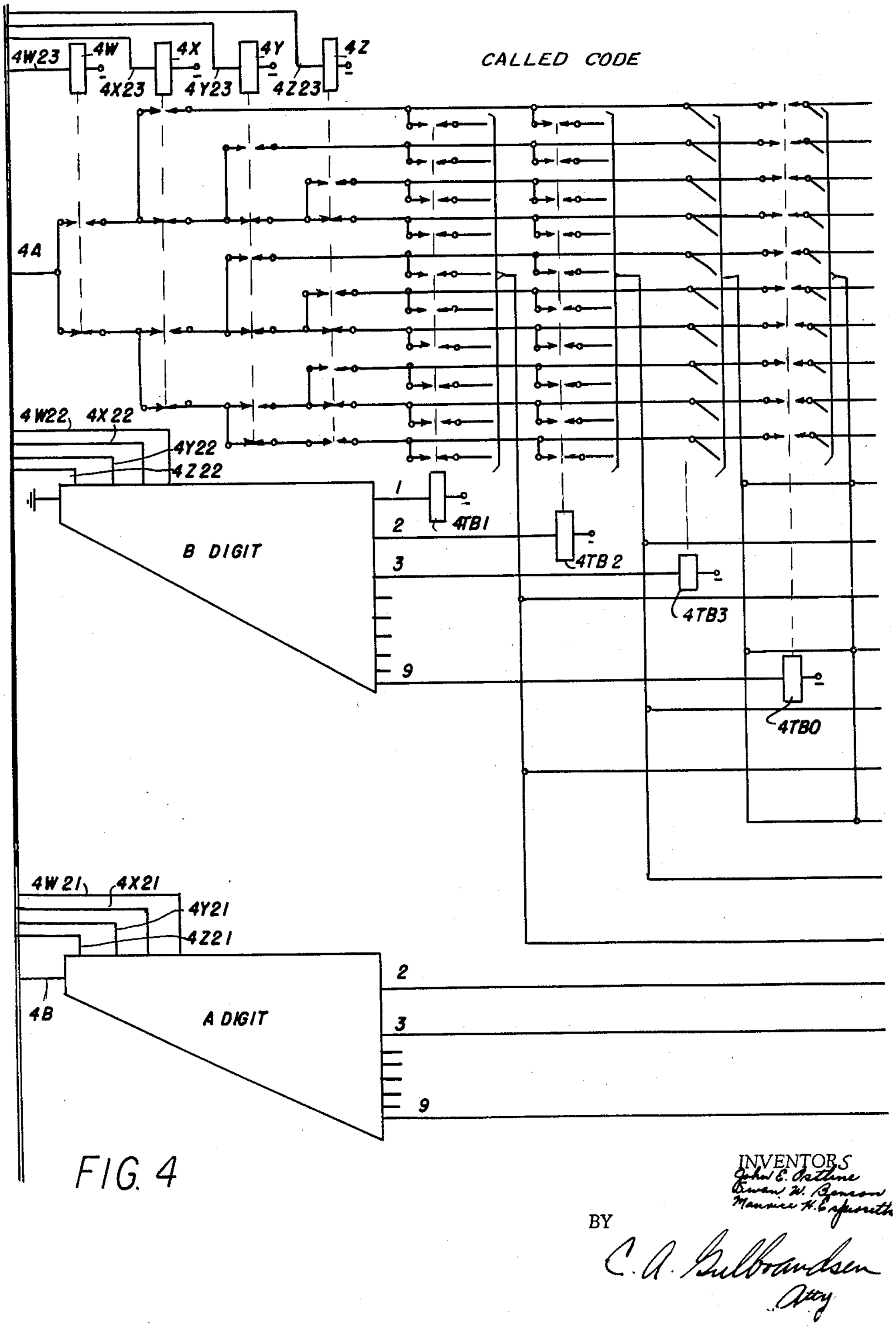

Closure of the W, X, Y and Z leads of Figure 4 to the tabulator, registers the called office or area 3-digit code. When the first 3 digits are an area code, the first or "A" digit dialed will be 2 through 9 inclusive, the second or "B" digit 2 through 9 inclusive. When the first 3 digits are an office code, the "A" and "B" digits are 2 through 9 inclusive, and the "C" digit 1 through 0 inclusive.

The following table shows the CODEL code used:

| Digit | Letters | CODEL Code |
|---|---|---|
| 1 | ---------- | WX |
| 2 | ABC | WY |
| 3 | DEF | WZ |
| 4 | GHI | XY |
| 5 | JKL | XZ |
| 6 | MNO | YZ |
| 7 | PRS | W |
| 8 | TUV | X |
| 9 | WXY | Y |
| 0 | ---------- | Z |

Figure 5:
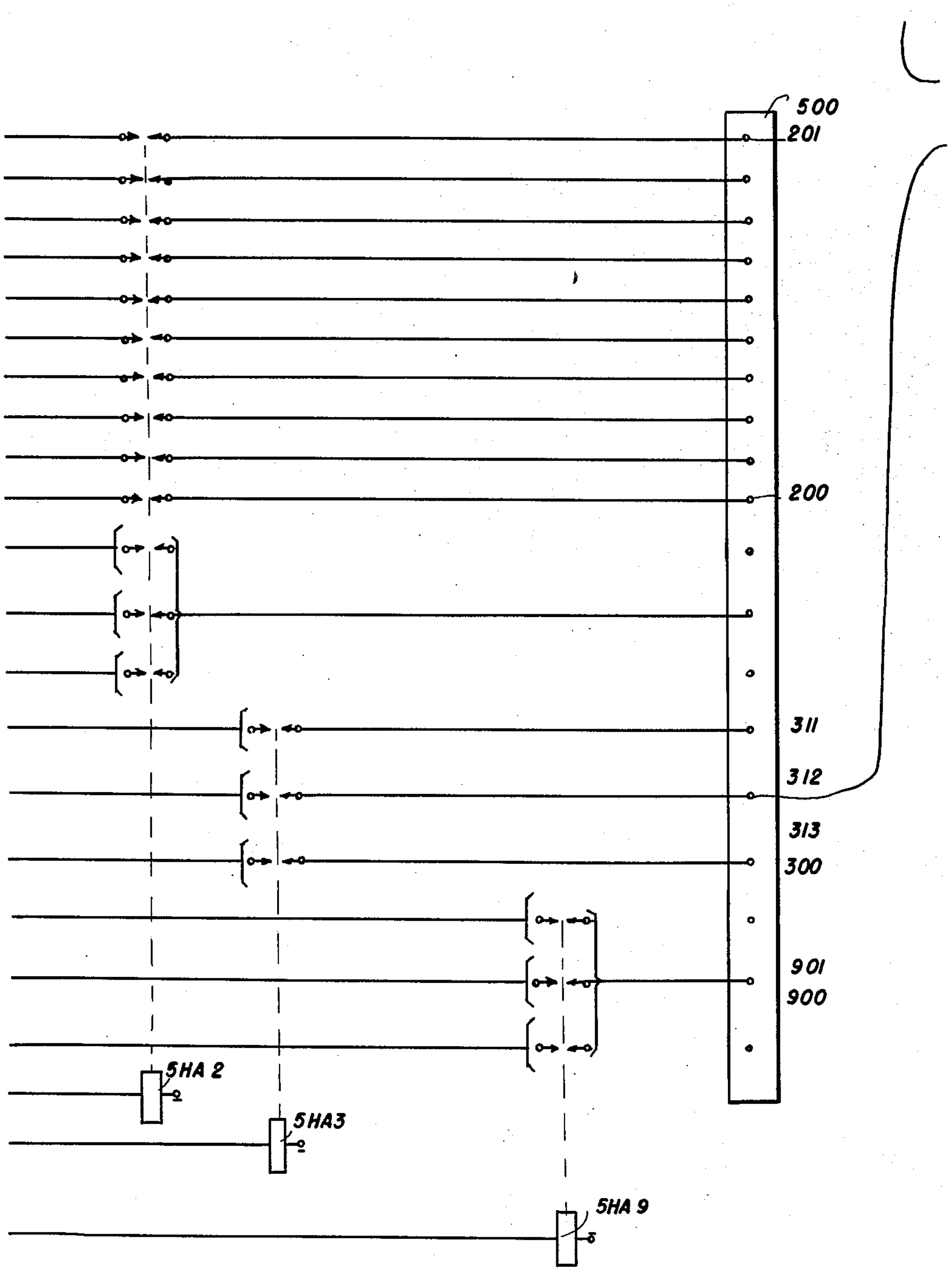

5HA7, 5HA8, 5HA9 in Fig. 5). Each set bar relays has its relay coils connected in multiple. Each set is energized from one of the 8 decimal leads corresponding to one of the 8 possible first digits in the 3-digit destination code. Destination codes appearing on each relay set are identified in the following table:

TABLE A

Relay HA2 (200 Group):

| | | | | | | | | | |
|---|---|---|---|---|---|---|---|---|---|
| 211, | 212, | 213, | 214, | 215, | 216, | 217, | 218, | 219, | 210, |
| 221 | | | | 225 | | | | | 220 |
| 231 | | | | 235 | | | | | 230 |
| 241 | | | | 245 | | | | | 240 |
| 251, | 252, | 253, | 254, | 255, | 256, | 257, | 258, | 259, | 250 |
| 261 | | | | 265 | | | | | 260 |
| 271 | | | | 275 | | | | | 270 |
| 281 | | | | 285 | | | | | 280 |
| 291 | | | | 295 | | | | | 290 |
| 201, | 202, | 203, | 204, | 205, | 206, | 207, | 208, | 209, | 200 |

Relay HA3 (300 Group): 311 through to 300
Relay HA4 (400 Group): 411 through to 400
Relay HA5 (500 Group): 511 through to 500
Relay HA6 (600 Group): 611 through to 600
Relay HA7 (700 Group): 711 through to 700
Relay HA8 (800 Group): 811 through to 800
Relay HA9 (900 Group): 911 through to 900

For an area code "A" digit of 3, relays 4W21 and 4Z21 are operated. Ground on lead 4B from relay 16CA is closed to relay HA3. Relay 5HA3 operates and closes a total of 100 leads, ten from each of the 10 relays, 4TB1 through 4TB0, to 100 possible individual destination code leads terminating on the destination terminal block 500 in Figure 5. "B" and "C" digit leads are identified in

TABLE B

| 4TB1, | 4TB2, | 4TB3, | 4TB4, | 4TB5, | 4TB6, | 4TB7, | 4TB8, | 4TB9, | 4TB0 |
|---|---|---|---|---|---|---|---|---|---|
| 11 | 21 | 31 | 41 | 51 | 61 | 71 | 81 | 91 | 01 |
| 12 | 22 | 32 | 42 | 52 | 62 | 72 | 82 | 92 | 02 |
| 13 | 23 | 33 | 43 | 53 | | | | | 03 |
| 14 | 24 | 34 | 44 | 54 | | | | | 04 |
| 15 | 25 | 35 | 45 | 55 | 65 | 75 | 85 | 95 | 05 |
| 16 | 26 | | | 56 | | | | | 06 |
| 17 | 27 | | | 57 | | | | | 07 |
| 18 | 28 | | | 58 | | | | | 08 |
| 19 | 29 | | | 59 | | | | | 09 |
| 10 | 20 | 30 | 40 | 50 | 60 | 70 | 80 | 90 | 00 |

Relays 4W21, 4X21, 4Y21 and 4Z21 register the "A" digit, 4W22, 4X22, 4Y22 and 4Z22 the "B" digit and 4W23, 4X23, 4Y23 and 4Z23 the "C" digit.

*Registration of originating office 3-digit code*

The originating office 3-digit code is registered similar to the destination 3-digit code described. The "A" digit is registered on relays 1W1, 1X1, 1Y1 and 1Z1, the "B" digit on relays 1W2, 1X2, 1Y2 and 1Z2, and the "C" digit on relays 1W3, 1X3, 1Y3 and 1Z3.

The "A" and "B" digits will be 2 through 9 inclusive and the "C" digit 1 through 0 inclusive.

*Registration of conversation time*

Figure 3:
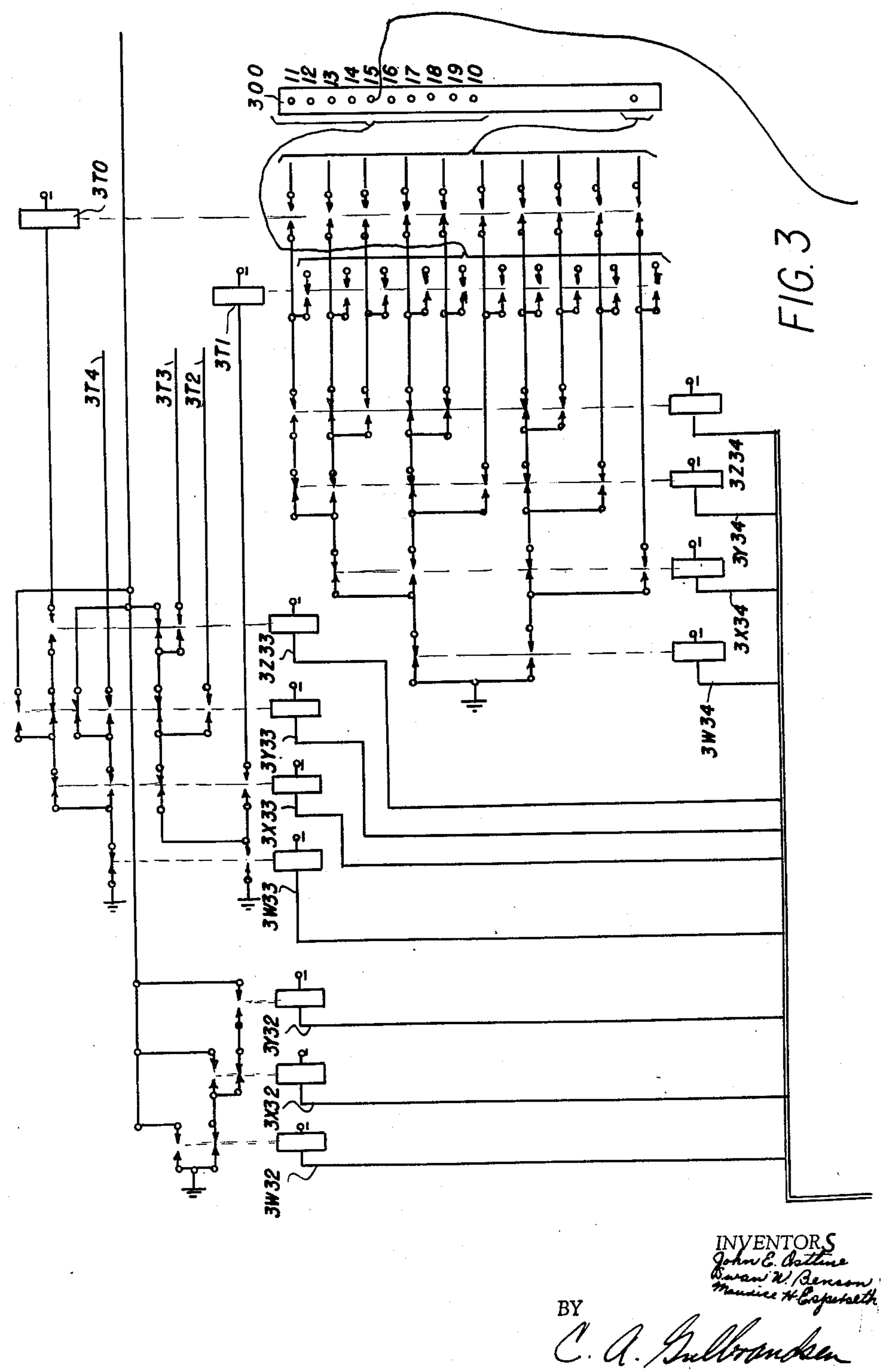

Time of conversation will be registered on the units, tens and hundreds relays of Figure 3.

Since this circuit is limited to a maximum calling time of 49 minutes, the hundreds digit should always be 0. To assure this, the operation of relays 3W32, 3X32 or 3Y32 places ground on lead 16INC to the tabulator to cause the tabulator to release the computer so that no action will take place.

The registration of the three sets of information described in this section takes place simultaneously.

*Translation*

Although the translation of the 3 sets of information from CODEL to single lead decimal form takes place simultaneously, each one will be considered separately. Assume a call from office RE-1 (731) to area 312 for 15 minutes.

*Translation of called office or called area 3-digit code*

Associated with the "A" digit relays in Figure 4 are 8 sets of relays (5HA2, 5HA3, 5HA4, 5HA5, 5HA6, Associated with the "B" digit relays in Figure 4 are 10 relays 4TB1 through 4TB0. Each of the 10 relays extends one group of 10 leads to each of the 8 sets of 100 leads on the HA relays of Fig. 5.

For an area "B" digit of 1, relays 4W22 and 4X22 are operated. Ground is closed to relay 4TB1. Relay 4TB1 operates and closes 10 leads, 1 through 0, from the "C" digit relays to leads 11 through 10 on all HA relays. Since relay 5HA3 is the only HA relay operated, the destination code marking will appear on the destination terminal strip 500 between 311 and 310.

For an area "C" of digit 2, relays 4W23 and 4Y23 are operated. Ground on lead 4A from relay 16CA is closed from the "C" digit relays, lead 12 from relay 4TB1, and lead 12 on bar relay 5HA3 to terminal 312 on the destination terminal block 500.

All relays mentioned in this section are operated simultaneously so that the 312 mark remains on the destination terminal block 500 during the complete action cycle of this circuit. The destination 3-digit code has now been translated into a single lead mark 312 on terminal block 500.

*Translation of calling office 3-digit code*

Associated with the "A" digit relays (Figure 1) is an 8 point "A" digit terminal block 101 on which terminate the leads 1-2A through 1-9A. Each terminal represents one of the 8 possible "A" digits (first digit) in the 3-digit originating office code.

For an originating office code "A" digit of 7, relay 1W1 is operated to close ground to the "A" digit terminal block point 1-7A.

Associated with the "B" digit relays (in Figure 1) are 8 relays 1-OB2 through 1-OB9. Each of these 8 relays extends one group of 10 leads to each of the 8 sets of ten leads on the 80 point "BC" digit terminal block 100.

For an originating office code "B" digit of 3, relays 1W2 and 1Z2 are operated. Ground is closed to relay 1OB3. Relay 1OB3 operates and closes 10 leads 1 through 0, from the "C" digit relays to leads 31 through 30 on the "BC" digit terminal block 100.

For an originating office code "C" digit of 1, relays 1W3 and 1X3 are operated. Ground is closed from the "C" digit relays, and lead 31 from relay 1–OB3 to terminal 31 on the "BC" digit terminal block 100.

Each relay 5H1 through 5H8 represents one of 8 possible "A" digits for the originating office code. When several possible originating office codes have the same "A" digit, an H relay having an equal number of make springs is jumpered to the "A" digit terminal corresponding to the duplicated "A" digit code number.

For simplicity we will assume the "A" digit point 7A of block 101 is jumpered to point 7B on block 201, and the "BC" digit point 31 of block 100 is jumpered to 7CF on block 200.

The operation of relay 2H7 from ground on the springs of relay 1W1 will close a path to the originating terminal block so that the ground mark on "BC" digit 31 now appears on originating block 202 terminal 7CR.

All relays mentioned in this section are operated simultaneously so that the 731 mark remains on the originating point 7CR during the complete action cycle of this circuit. The originating office 3-digit code has now been translated into a single lead mark.

*Translation of conversation time*

For conversation times of 49 minutes or less, the hundreds digit relays 3W32, 3X32 or 3Y32 should never be operated. Should any of these relays operate because of incorrect marking from the tabulator, the lead 16INC will be grounded as mentioned.

Associated with each of the 5 leads, 1 through 4, and 0, from the tens digit relays are 5 relays, 3T1 through 3T4 and 3T0. These relays correspond to each of the 5 possible tens digits that can be used. All unused codes for digits 5 through 9 cause ground to be applied to lead 16INC.

For a tens digit of 1, relays 3W33 and 3X33 are operated. This action closes ground over lead 1 to relay 3T1. Relay 3T1 operates and closes 10 leads 1 through 0 from the units digit relays to an appropriate group of 10 one-minute relays, each of which terminates in the coil of a minutes relay whose tens digit corresponds to the tens digit of the conversation time.

For a units digit of 5, relays 3X34 and 3Z34 operate. This action closes ground over lead 5 from the units digit relays, and lead 15 from relay 3T1 to minutes relay 8M15. Relay 8M15 operates. The conversation time in CODEL form has now been translated into a single minute relay operation.

*Combining markings to obtain (rate) (time) product originating code bar relay*

Figure 6:
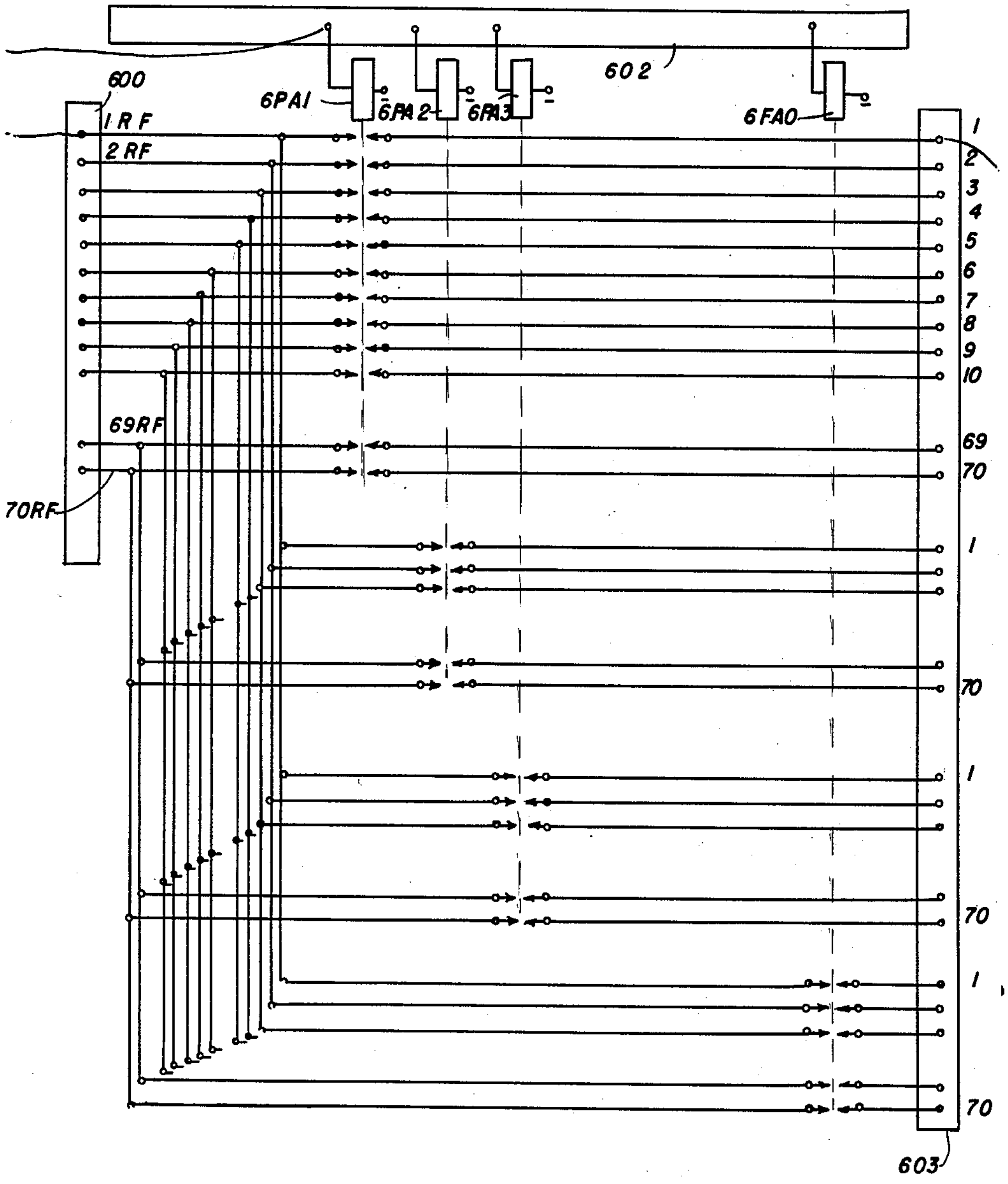
Figure 7:
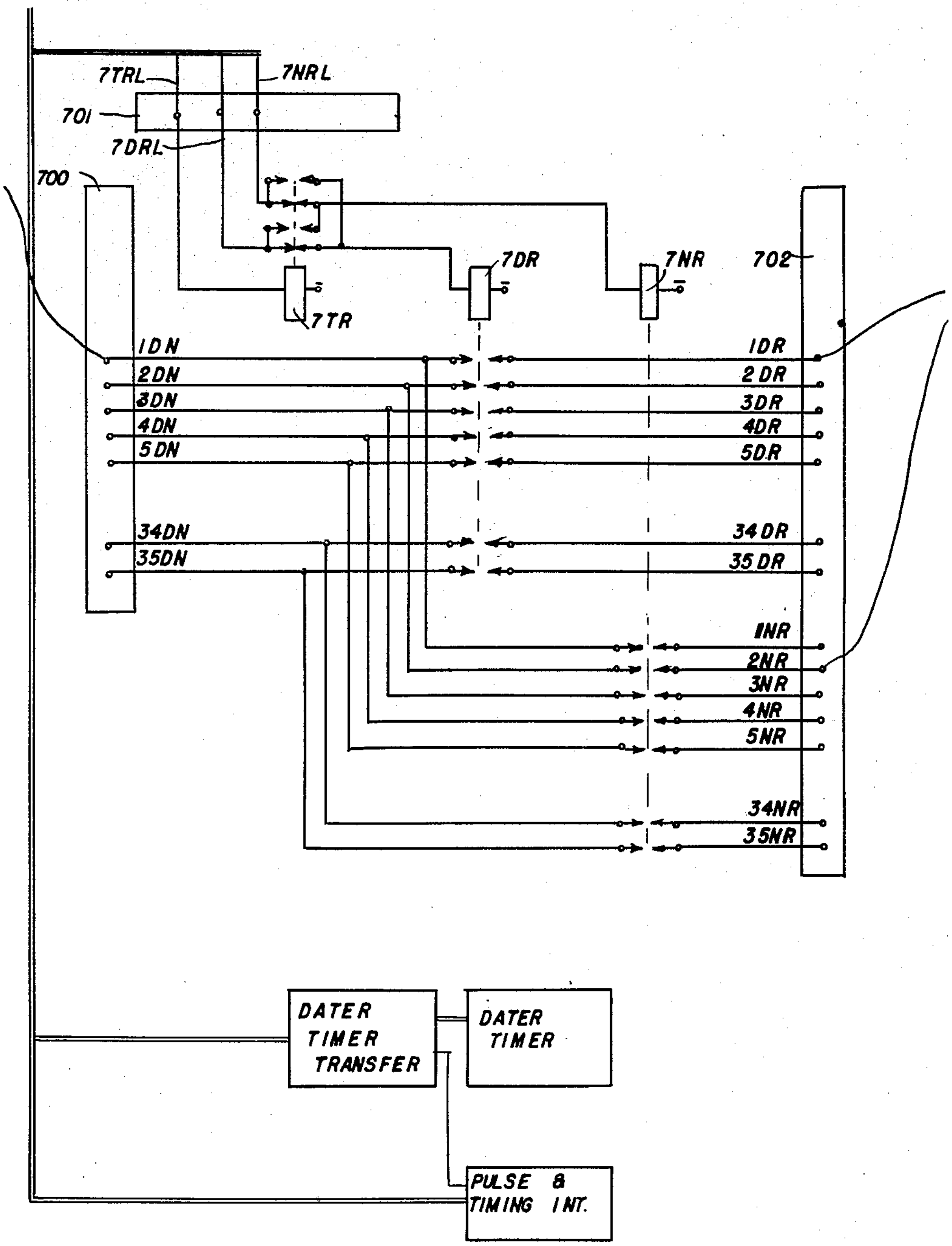

For each calling office code which is to permit access to the computer, there is an associated PA, originating code bar relay (Fig. 6). Each office code which can be marked on the originating terminal block will be strapped to a PA relay. Assume that point 7CR (Figure 2), on which the originating code of 731 may be marked, is strapped to the windings of the originating code bar relay 6PA1.

Each of the 70 relay make springs which terminate on the point-to-point marking terminal block 600 may be jumpered to a different destination code on the destination terminal block 500. The computer will be able to provide rates for all areas and offices whose 3-digit codes are so jumpered.

Assume destination code 312 on the destination terminal block 500 is jumpered to point 1RF on relay 6PA1. This point would also be multipled to point 1RF on all other PA relays so that other local offices can have computer access to the rate relays for this same destination code.

The operation of a PA relay corresponding to the originating office 3-digit code closes ground from one of the destination code points on the destination terminal block 500 to one of the points on the day-night rate terminal block 603.

Assume point 1 on the point-to-point group terminal block 603 is jumpered to point 1DN on the day-night rate terminal block 700 as the first day-night rate of the group.

Operation of relay 6PA1 from ground on lead 7CR closes ground from point 312 to point 1DN. The originating and destination code single lead markings have now been converted into a single rate lead mark.

*Day and night rate relays*

Figure 8:
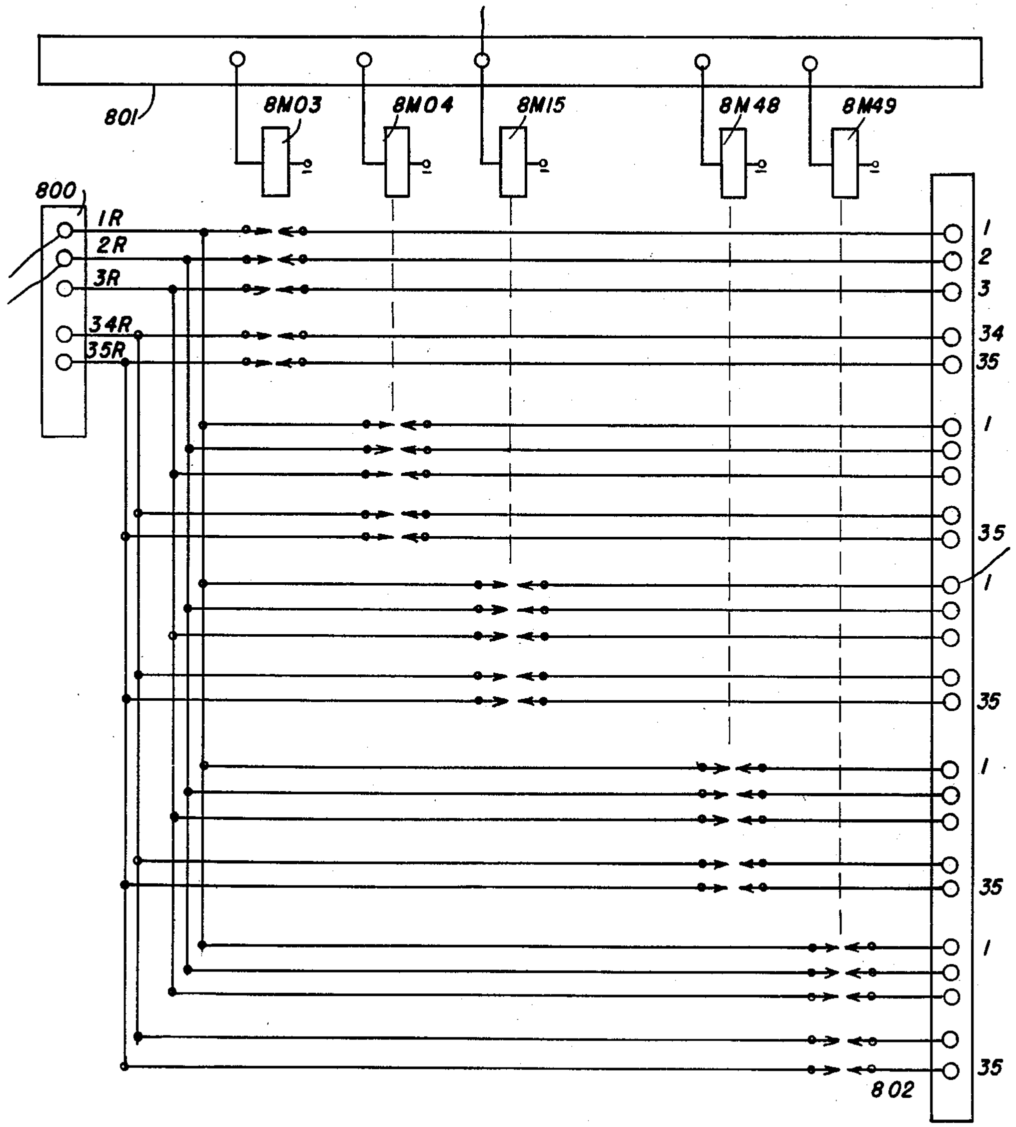

Ground on lead 7DRL from the dater timer closes day rate relay 7DR to extend a ground mark on the day-night rate terminal block to one of 35 base rate terminals of block 702 associated with the minutes bar relays of Figure 8.

When the night rate takes effect, ground is removed from lead 7DRL and placed on lead 7NRL by the dater timer. This action transfers each rate lead DN from a point on the base rate terminal block 702 corresponding to the day base rate, to a point on the base rate terminal block corresponding to the night base rate.

If a call starts when one rate is in effect and ends when the other is in effect, lead 7TRL is grounded by the tabulator. Transfer relay 7TR operates and reverses the day and night rate relay leads 7DRL and 7NRL so that the charge will be computed on the base rate in effect at the start of the call.

Assume day rate lead 1DR and night rate lead 1NR on the date rate and night rate terminal block 702 are jumpered to base rate terminals 1R and 2R respectively on the base rate terminal block (Figure 8). If the day rate is in effect, a ground marking on rate lead 1ND (Figure 7) would be closed through date rate relay 7DR to the make contacts wired to terminal 1R on each of the 47 minute bar relays. If night rates are in effect, the ground will be closed through relay 7NR to terminal 2R and then to the corresponding make contacts on all minute bar relays.

*Minutes bar relays*

For conversation times of 3 minutes or less, minutes bar relay 8MO3 will be operated as a result of the translation described. For conversation times of from 4 minutes to 49 minutes, a corresponding minutes bar relay 8M4 through 8M49 will be operated in a similar manner.

Assume a conversation time of 15 minutes has caused the registration and translation features of the circuit of Figure 3 to operate minutes relay 8M15 as described. A ground mark corresponding to the day or night base rates will appear on points 1 tor 2 respectively on that portion of the base-time product terminal block 802 associated with minutes bar relay 8M15.

The (base rate) (time) product has now been marked by ground on a single lead on the base-time product terminal block 802.

*Day, night, and base rate strapping*

For each originating office code, there is a set of rate tables which give both day and night rate charges for each minute of conversation time up to 49 for each destination code for which this circuit is to provide charges. A sample of such a rate table is shown.

TYPICAL STRAP WIRING SHOWING NIGHT AND DAY RATE AND BASE RATE ORIGINATING CODE 731 AND DESTINATION CODE 312

ORIGINATING CODE 731

STRAP TERMINALS 1-7A TO 2-7B, 1-31 (BC DIGIT) TO 2-7CR to 6PA1

RELAY USED 2H7

DESTINATION CODE 312

STRAP TERMS 312 (DESTINATION) TO 621RF; TERM 1 OF CODE GROUP 6-1 TO 7-1DN, 7-1DR TO 8-1R; 7-1NR TO 8-2R

RELAYS USED 6PA1, 7DR AND 7NR

Figure 9:
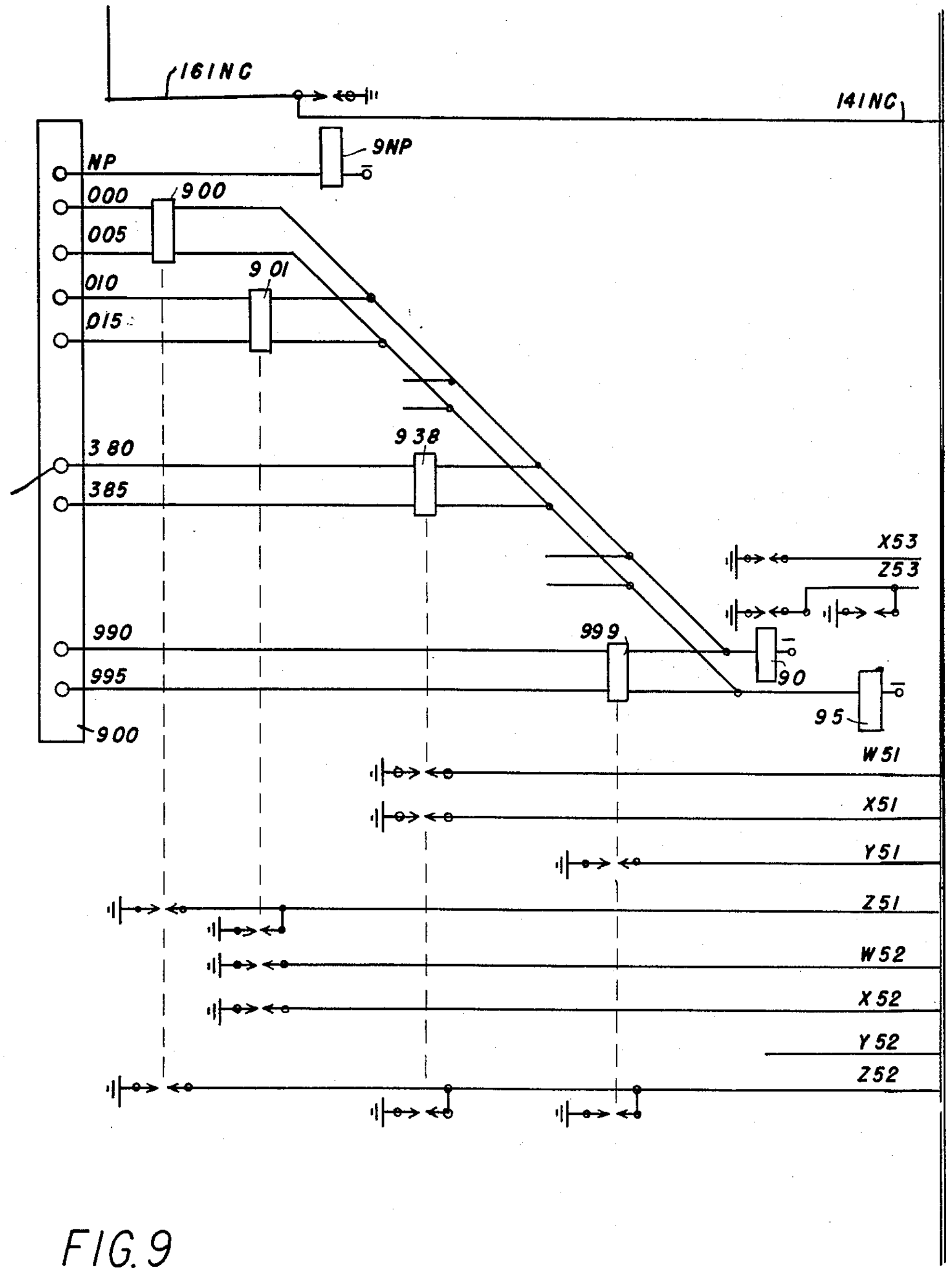
Figure 10:
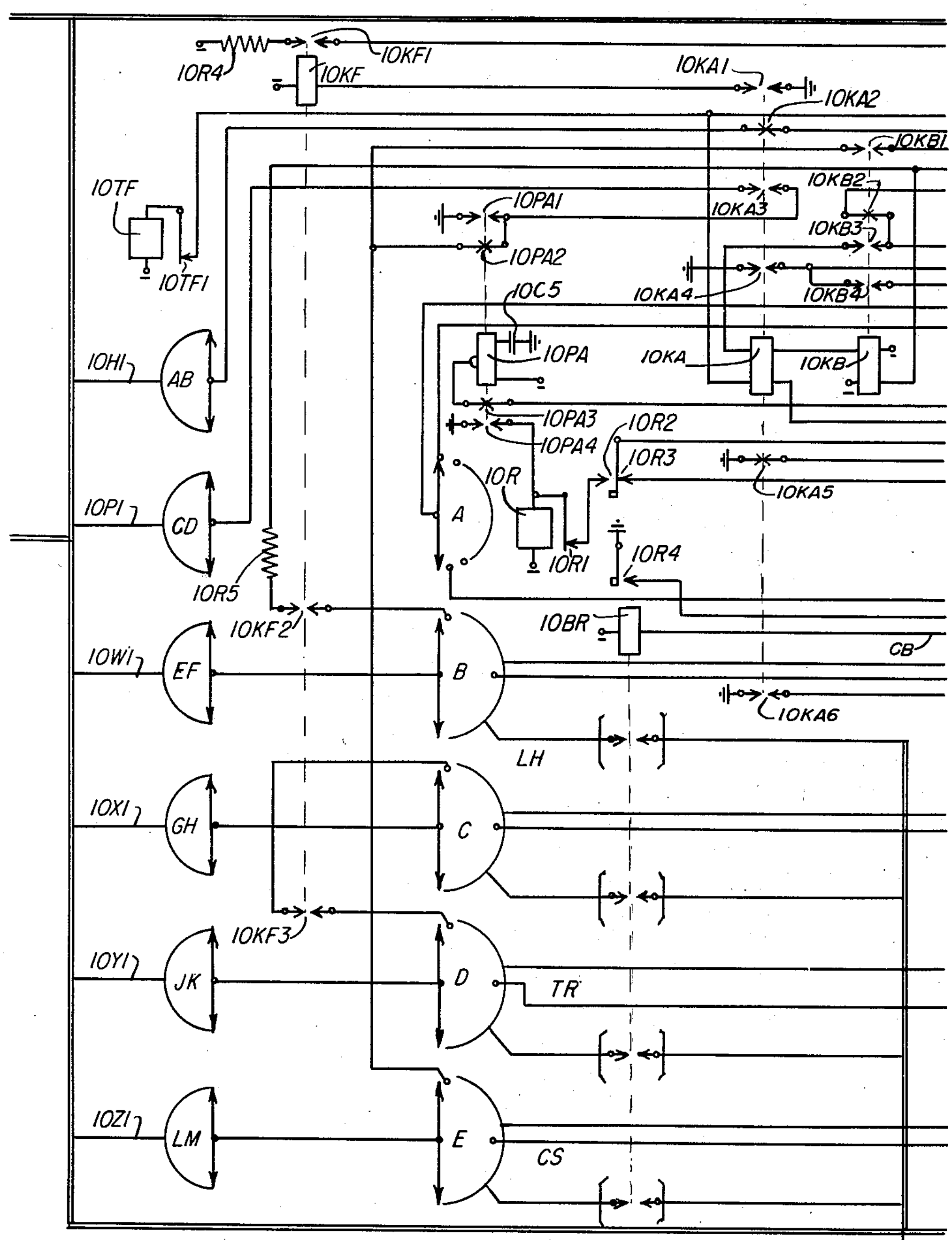
Figure 11:
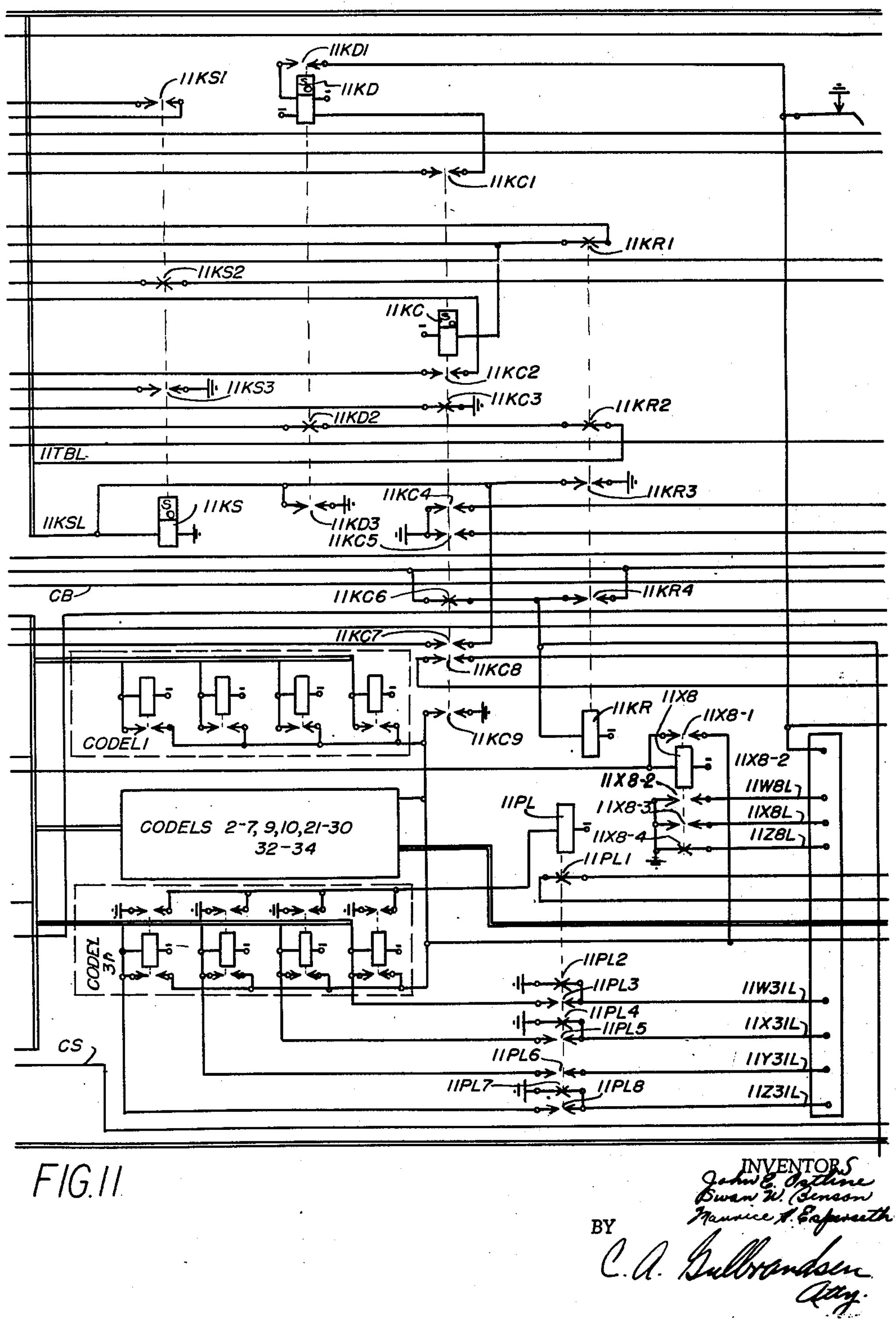
Figure 12:
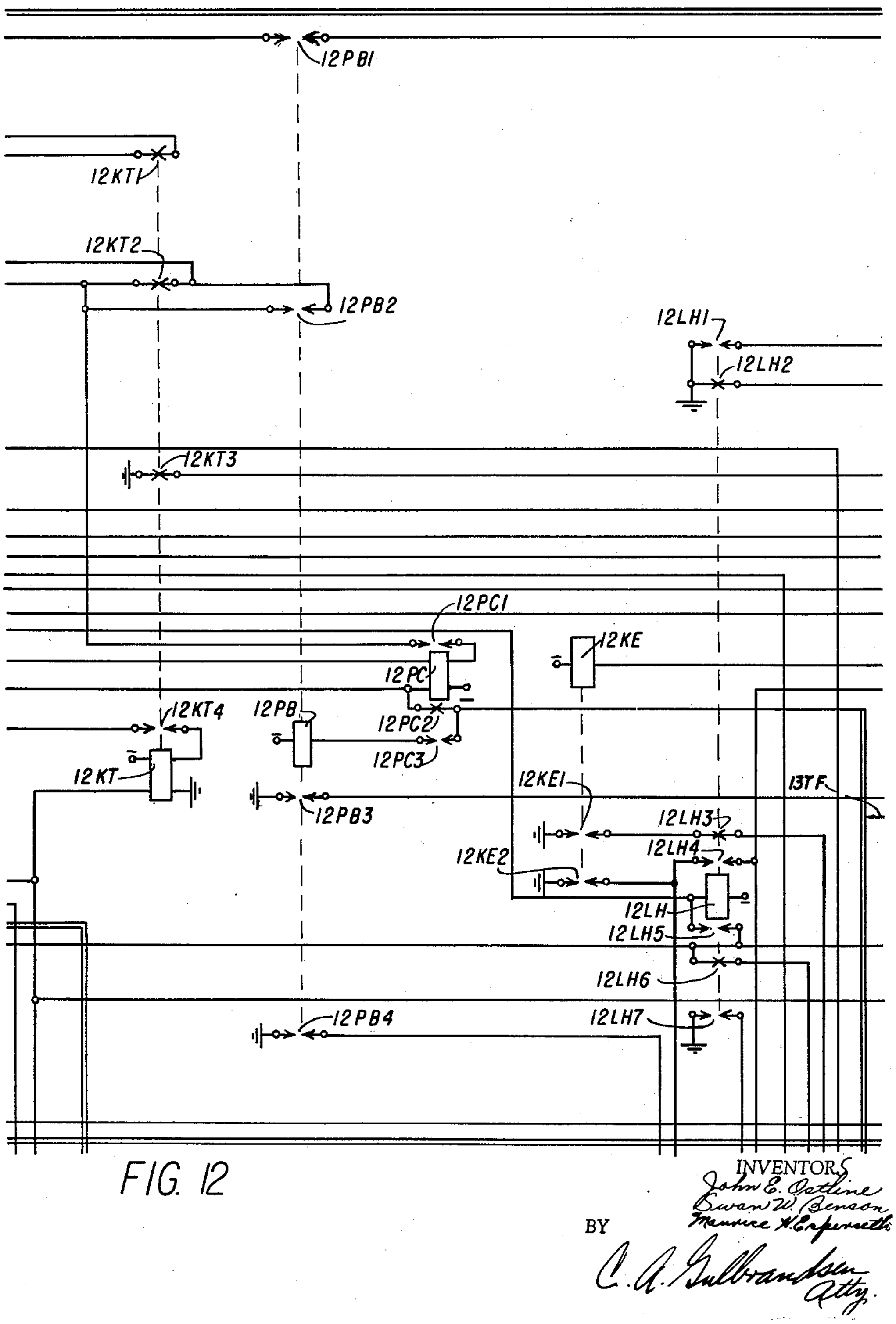
Figure 13:
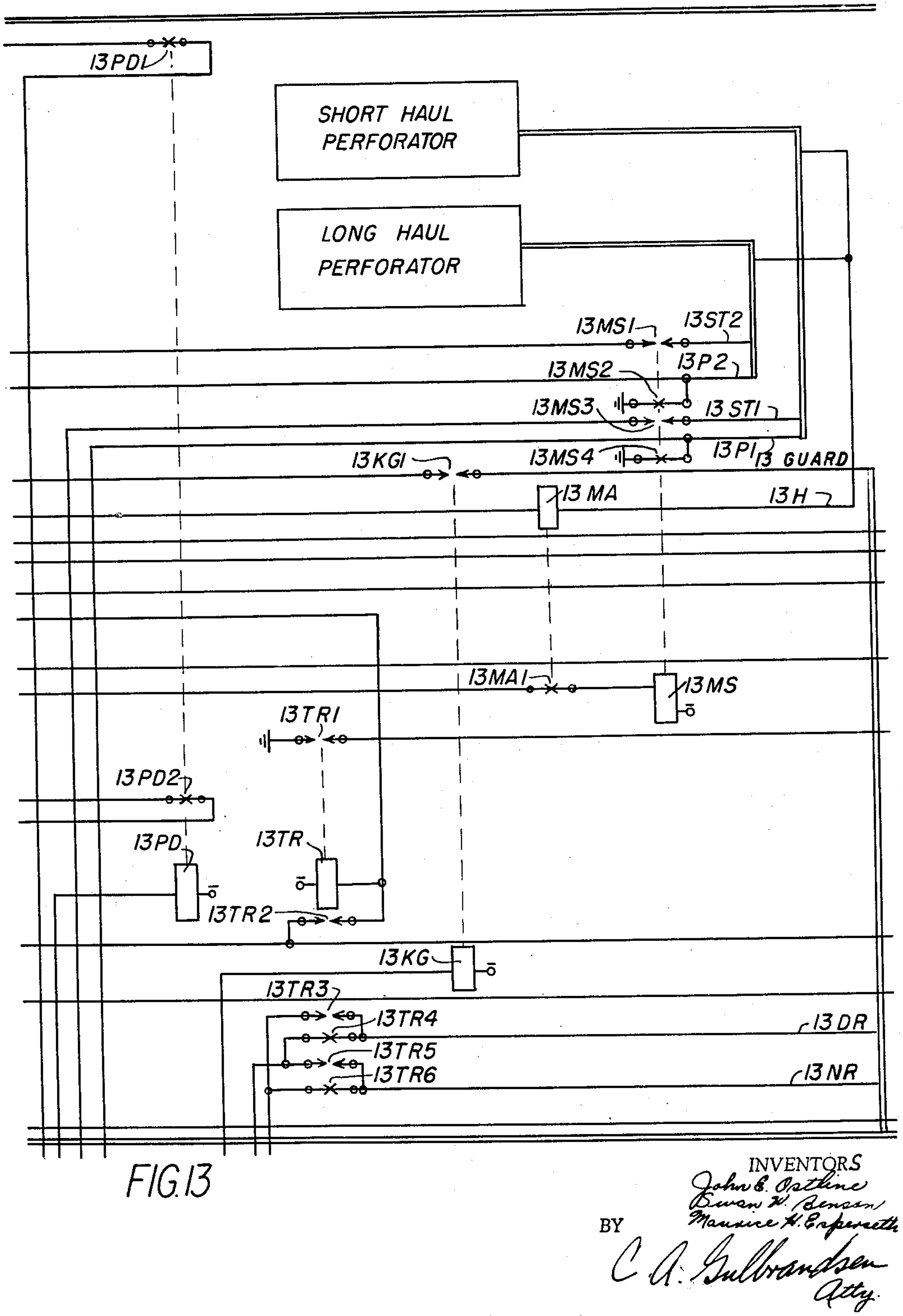
Figure 14:
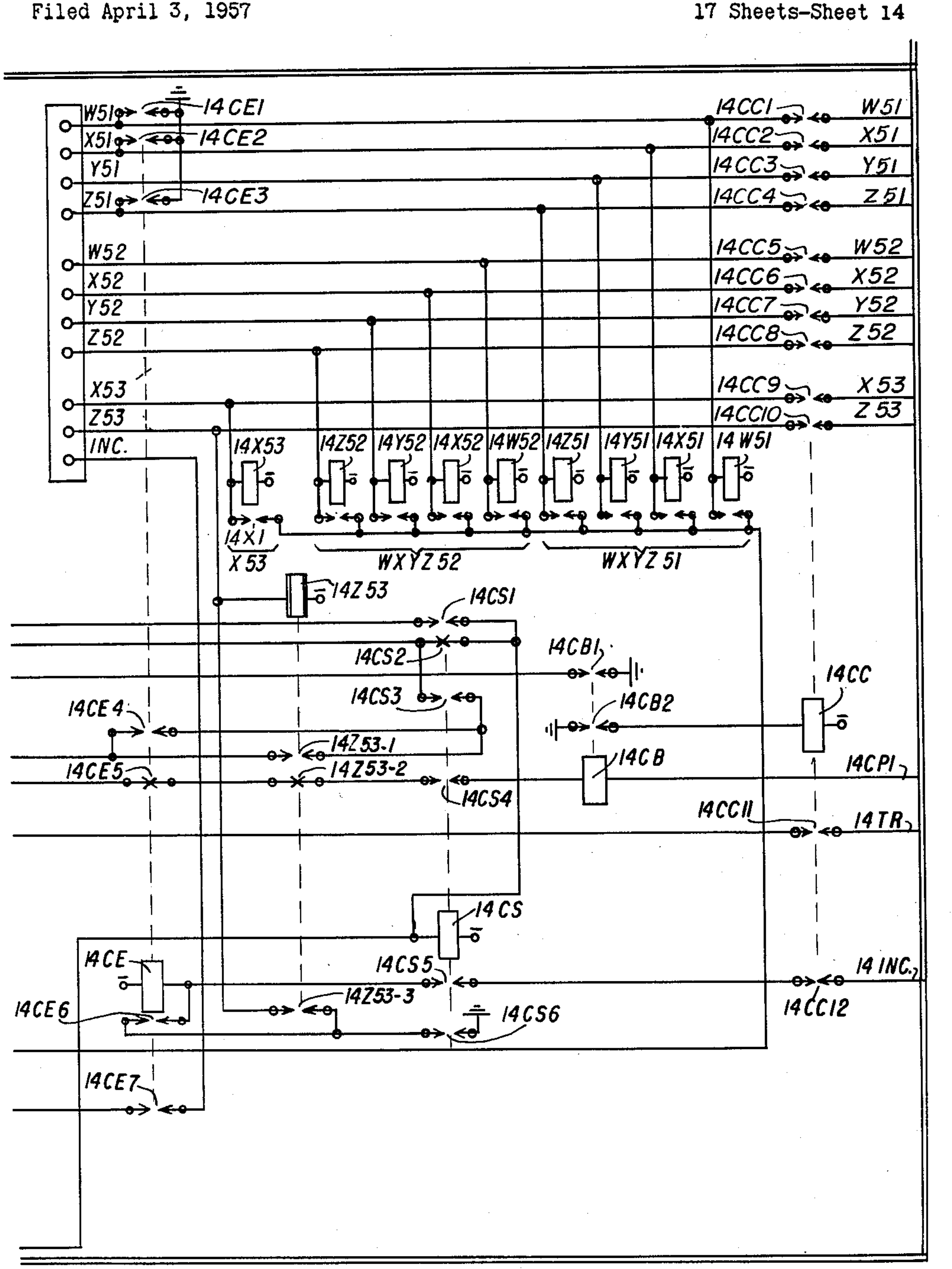
Figure 15:
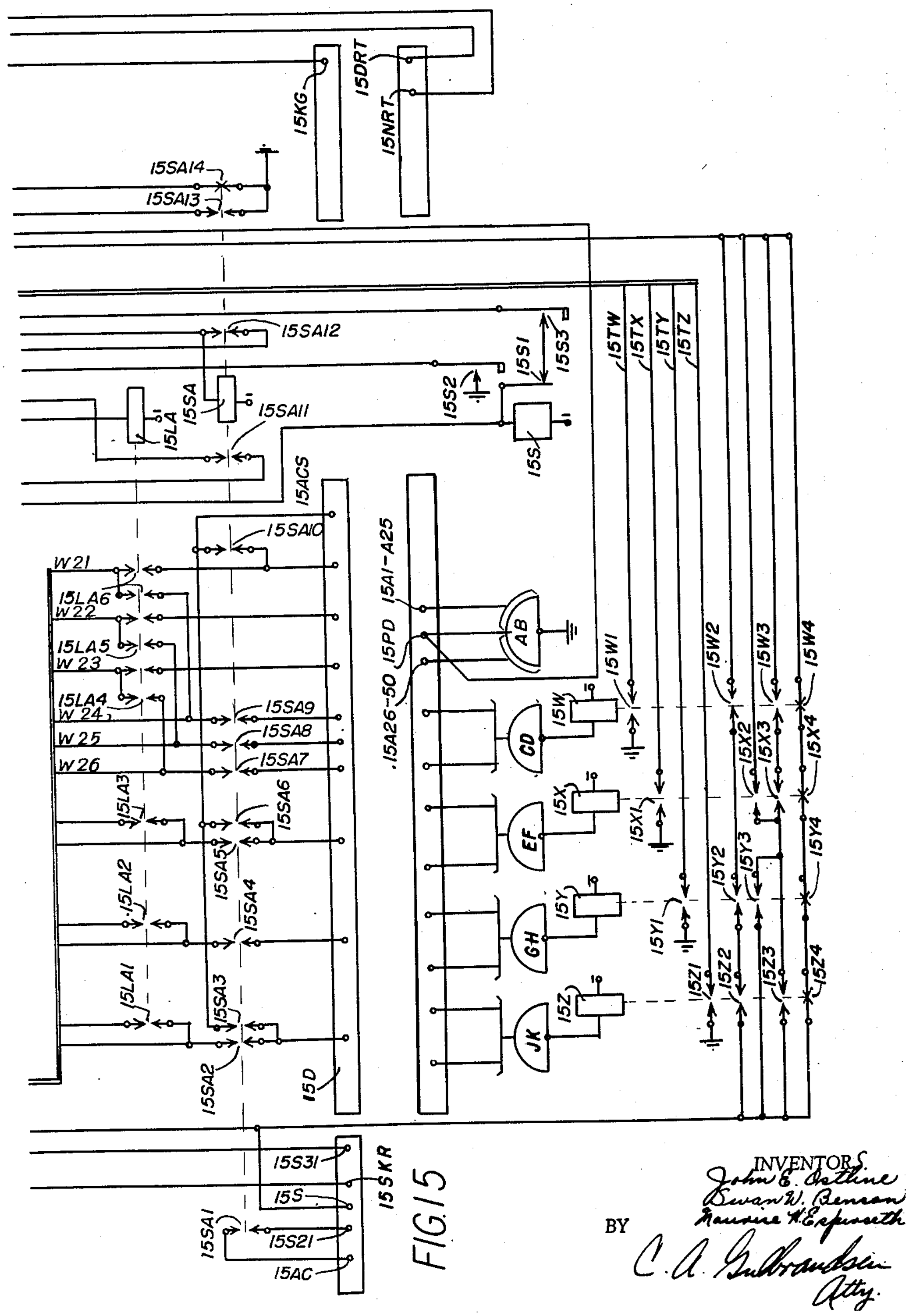

| Day Rate | | Strap | | Night Rate | | Strap | |
|---|---|---|---|---|---|---|---|
| Min. | Chg. | Fig. 8 | Fig. 9 | Min. | Chg. | Fig. 8 | Fig. 9 |
| 1 | | | | 1 | | | |
| 2 | | | | 2 | | | |
| 3 | .80 | 1M03 to 080 | | 3 | .65 | 2M03 to 065 | |
| 4 | 1.05 | 1M04 to 105 | | 4 | .85 | 2M04 to 085 | |
| 5 | 1.30 | 1M05 to 130 | | 5 | 1.05 | 2M05 to 105 | |
| 6 | 1.55 | 1M06 to 155 | | 6 | 1.25 | 2M06 to 125 | |
| 7 | 1.80 | 1M07 to 180 | | 7 | 1.45 | 2M07 to 145 | |
| 8 | 2.05 | 1M08 to 205 | | 8 | 1.65 | 2M08 to 165 | |
| 9 | 2.30 | 1M09 to 230 | | 9 | 1.85 | 2M09 to 185 | |
| 10 | 2.55 | 1M10 to 255 | | 10 | 2.05 | 2M10 to 205 | |
| 11 | 2.80 | 1M11 to 280 | | 11 | 2.25 | 2M11 to 225 | |
| 12 | 3.05 | 1M12 to 305 | | 12 | 2.45 | 2M12 to 245 | |
| 13 | 3.30 | 1M13 to 330 | | 13 | 2.65 | 2M13 to 265 | |
| 14 | 3.55 | 1M14 to 355 | | 14 | 2.85 | 2M14 to 285 | |
| 15 | 3.80 | 1M15 to 380 | | 15 | 3.05 | 2M15 to 305 | |
| 16 | 4.05 | 1M16 to 405 | | 16 | 3.25 | 2M16 to 325 | |
| 17 | 4.30 | 1M17 to 430 | | 17 | 3.45 | 2M17 to 345 | |
| 18 | 4.55 | 1M18 to 455 | | 18 | 3.65 | 2M18 to 365 | |
| 19 | 4.80 | 1M19 to 480 | | 19 | 3.85 | 2M19 to 385 | |
| 20 | 5.05 | 1M20 to 505 | | 20 | 4.05 | 2M20 to 405 | |
| 21 | 5.30 | 1M21 to 530 | | 21 | 4.25 | 2M21 to 425 | |
| 22 | 5.55 | 1M22 to 555 | | 22 | 4.45 | 2M22 to 445 | |
| 23 | 5.80 | 1M23 to 580 | | 23 | 4.65 | 2M23 to 465 | |
| 24 | 6.05 | 1M24 to 605 | | 24 | 4.85 | 2M24 to 485 | |
| 25 | 6.30 | 1M25 to 630 | | 25 | 5.05 | 2M25 to 505 | |
| 26 | 6.55 | 1M26 to 655 | | 26 | 5.25 | 2M26 to 525 | |
| 27 | 6.80 | 1M27 to 680 | | 27 | 5.45 | 2M27 to 545 | |
| 28 | 7.05 | 1M28 to 705 | | 28 | 5.65 | 2M28 to 565 | |
| 29 | 7.30 | 1M29 to 730 | | 29 | 5.85 | 2M29 to 585 | |
| 30 | 7.55 | 1M30 to 755 | | 30 | 6.05 | 2M30 to 605 | |
| 31 | 7.80 | 1M31 to 780 | | 31 | 6.25 | 2M31 to 625 | |
| 32 | 8.05 | 1M32 to 805 | | 32 | 6.45 | 2M32 to 645 | |
| 33 | 8.30 | 1M33 to 830 | | 33 | 6.65 | 2M33 to 665 | |
| 34 | 8.55 | 1M34 to 855 | | 34 | 6.85 | 2M34 to 685 | |
| 35 | 8.80 | 1M35 to 880 | | 35 | 7.05 | 2M35 to 705 | |
| 36 | 9.05 | 1M36 to 905 | | 36 | 7.25 | 2M36 to 725 | |
| 37 | 9.30 | 1M37 to 930 | | 37 | 7.45 | 2M37 to 745 | |
| 38 | 9.55 | 1M38 to 955 | | 38 | 7.65 | 2M38 to 765 | |
| 39 | 9.80 | 1M39 to 980 | | 39 | 7.85 | 2M39 to 785 | |
| 40 | 10.05 | 1M40 to NP | | 40 | 8.05 | 2M40 to 805 | |
| 41 | 10.30 | 1M41 to NP | | 41 | 8.25 | 2M41 to 825 | |
| 42 | 10.55 | 1M42 to NP | | 42 | 8.45 | 2M42 to 845 | |
| 43 | 10.80 | 1M43 to NP | | 43 | 8.65 | 2M43 to 865 | |
| 44 | 11.05 | 1M44 to NP | | 44 | 8.85 | 2M44 to 885 | |
| 45 | 11.30 | 1M45 to NP | | 45 | 9.05 | 2M45 to 905 | |
| 46 | 11.55 | 1M46 to NP | | 46 | 9.25 | 2M46 to 925 | |
| 47 | 11.80 | 1M47 to NP | | 47 | 9.45 | 2M47 to 945 | |
| 48 | 12.05 | 1M48 to NP | | 48 | 9.65 | 2M48 to 965 | |
| 49 | 12.30 | 1M49 to NP | | 49 | 9.85 | 2M49 to 985 | |

Assume that for calls from originating office 731 to 312, the strapping of the table is used.

The 3-minute scharge for all leads extended by relay 8MO3 terminating on the base-time product terminal block 802 is set by the strapping between the appropriate base-time product terminal and the toll charge terminal block 900. The charge for every other minute up to 49 minutes is determined by strapping between corresponding springs of each minutes relay and appropriate toll charge terminal on the toll charge terminal block 900.

Assume that terminal 1 of the minutes relay 8M15 is strapped to terminal 380 corresponding to the $3.80 day rate charge indicated in the table. Assume also that the day rate is in effect.

A ground mark on terminal 1 of minutes relay 8M15 will be closed to terminal 380 on the toll charge terminal block 900.

The appropriate toll charge is now marked on a single lead on the toll charge terminal block 900.

*Toll charge translation from single lead decimal form to CODEL code*

On the toll charge terminal block 900 appears a terminal for every 5 cent interval from $0 to $9.95. Ground on any terminal having a units digit of 0 will energize relay 90 in series with the #1 winding of the appropriate one of 100 charge relays 900 through 999. Ground on any terminal having a units digit 5 will energize relay 95 in series with the #2 winding of the appropriate one of 100 charge relays 900 through 999. The operation of these relays grounds the appropriate CODEL code leads to the tabulator.

Assuming a ground marking on lead 380. Ground is closed to the #1 winding of relay 938 and to relay 90 in series. Relay 938 operates and grounds leads W52 and Z53. These leads are momentarily closed to the tabulator where the total charge is stored on tabulator CODEL 51 and 52 and on relays X52 and Z53. The total charge has now been returned to the tabulator.

*Release*

The completion of the computer function is indicated by the operation of the cents relay 90 or 95. The operation of either of these relays closes ground over lead Z53 to the tabulator. This action operates a relay in the tabulator which opens lead 14CP1 to release relays 16SO1 and 16CA.

Ground is removed from leads 4A and 4B by the restoration of relay 16CA. The computer has now completed its action.

If relay 16CA for some reason does not restore by the time the timing circuits of relays 16TA, 16TB and 16TC have cycled, then relay 16TC will open relay 16CA and place ground on lead 16INC to the tabulator. In either case, the restoration of relay 16CA restores the circuit to normal.

Release of any SO relay after its associated tabulator has received its toll charge, permits access of another tabulator as described.

While one embodiment of the invention has been disclosed and described, it will be understood that various modifications may be made therein which are within the true spirit and scope of the invention.

What is claimed is:

1. In an automatic toll ticketing telephone system a calling line, a called line, means for registering the designations of said lines, means for establishing a connection between said lines, timing means associated with said connection for registering the duration of said connection, intermediate registering means, means responsive to the termination of said connection for operably associating said intermediate registering means, said intermediate registering means operated to forward all of said registered information and operably associating a relay type computing means with itself, said computing means arranged to compute the toll charge for a telephone call based upon the originating code, the destination code, the time duration in a one or two marking four element code and the rate, said computer extending the computed toll charge in code to said intermediate registering means, transfer means in said intermediate registering means then operated to transfer all of the registered information to a recording means.

2. In an automatic telephone system, a first exchange including switching apparatus and a calling station identified by a plural digit directory number, a second exchange including switching apparatus and a called station identified by a plural digit directory number, a toll ticketing repeater in said first exchange, a tabulator and computer accessible to said repeater, control means at said calling station for operating said switching apparatus in said first exchange to extend a connection to said repeater, a register device individual to said repeater, means in said repeater directly controlled by said control means at said calling station for operating said register device to record each of the digits of said called station directory number and to register the directory number of the calling station, other means in said repeater controlled by said calling device for extending said connection from said repeater by way of said second exchange switching apparatus in accordance with said called station directory number in order to connect said calling and called stations, and means for thereafter registering the duration of the call, means responsive to the termination of the call for operably associating a tabulator with said toll ticketing repeater and transferring the registered information thereto, said tabulator releasing said toll ticketing repeater after receiving the information from it, and then operably associating a computer with itself, said toll charge computer arranged to compute the toll charges for a telephone call based upon the originating point, the destination the time duration of said call and the rate, said computer comprising a group of rate indicating relays, nine decoding relay groups, and toll charge coding relays, the first three of said nine decoding relay groups with auxiliary relays arranged to decode the originating office code as received from the toll ticketing repeaters, the second three of said nine decoding relay groups with auxiliary relays arranged to decode the destination code and the third group of said nine decoding relay groups with auxiliary relays arranged to decode the time duration of the call, said decoded originating office indication and said decoded destination indication combined through a relay circuit to a base rate indication, said base rate indication and an indication from said rate relays combined in a second relay circuit to a final rate indicator, said final rate indicator and said decoded time duration indicator combined in a third relay circuit to a toll charge indicator, said toll charge indicator extended to said toll charge indicating relays to produce a coded indication of said toll charge, said toll charge registered in said tabulator which then releases said computer and operably associates a recording means with itself to record all of the pertinent data for a toll ticket.

3. In an automatic toll ticketing telephone system, a first exchange provided with first switching apparatus and toll ticketing equipment accessible from said switching apparatus, a first incoming repeater, a first subscriber's station identified by plural digit directory number, a second exchange provided with second switching apparatus, a second subscriber station identified by a plural digit directory number, a second repeater in said second exchange, a trunk line tying said repeater from said second exchange to said first exchange through said first repeater to said toll ticketing equipment, the repeater in said second exchange accessible from said second switching equipment, a calling device at said first station for operating said first switching apparatus to extend the connection from said first station to said toll ticketing equipment, and means in said ticketing equipment controlled by said first station calling device for registering therein the directory number of the calling party station and the called station and to further extend said connection from the toll ticketing equipment to said called station and to time the duration of said call, said toll ticketing equipment having means for disabling its own detecting means and for arranging its circuit to receive the calling party identification information from said second branch exchange through said first repeater and first trunk line in code form simultaneously with the dialling of the called party directory number into the toll ticketing equipment, and to thereafter time the duration of said call, means in said toll ticketing equipment responsive to the termination of a call for operably associating a tabulator with said toll ticketing repeater and transferring the registered information thereto, said tabulator releasing said toll ticketing repeater after receiving the information from it, and then operably associating a computer with itself, said toll charge computer arranged to compute the toll charges for a telephone call based upon the originating point, the destination, the time duration of said call and the rate, said computer comprising a group of rate indicating relays, nine decoding relay groups, and toll charge coding relays, the first three of said nine decoding relay groups with auxiliary relays arranged to decode the originating office code as received from the tabulator, the second three of said nine decoding relay groups with auxiliary relays arranged to decode the destination code and the third group of said nine decoding relay groups with auxiliary relays arranged to decode the time duration of the call, said decoded originating office indication and said decoded destination indication combined through a relay circuit into a base rate indication, said base rate indication and an indication from said rate relays combined in a second relay circuit into a final rate indication, said final rate indication and said decoded time duration indication combined in a third relay circuit into a toll charge indication, said toll charge indication extended to said toll charge indicating relays to produce a coded indication of said toll charge, said toll charge registered in said tabulator which then releases said computer and operably associates a recording means with itself to record all of the pertinent data for a toll ticket.

4. In an automatic toll ticketing telephone system, a first exchange provided with first switching apparatus and toll ticketing equipment accessible from said switching apparatus, a first incoming repeater, a first subscriber's station identified by plural digit directory number, a second exchange provided with second switching apparatus, a second subscriber station identified by a plural digit directory number, a second repeater in said second exchange, a trunk line tying said repeater from said second exchange to said first exchange through said first repeater to said toll ticketing equipment, the repeater in said second exchange accessible from said second switching equipment, a calling device at said first station for operating said first switching apparatus to extend the connection from said first station to said toll ticketing equipment, and means in said ticketing equipment controlled by said first station calling device for registering therein the directory number of the calling party station and the called station and to further extend said connection from the toll ticketing equipment to said called station and to time the duration of said call, said toll ticketing equipment having means for disabling its own detecting means and for arranging its circuit to receive the calling party identification information from said second branch exchange through said first repeater and first trunk line in code form simultaneously with the dialling of the called party directory number into the toll ticketing equipment, and to thereafter time the duration of said call, means in said toll ticketing equipment responsive to the termination of a call for operably associating a tabulator with said toll ticketing repeater and transferring the registered information thereto, said tabulator releasing said toll ticketing repeater after receiving the information from it, and then operably associating a computer with itself, said toll charge computer arranged to compute the toll charges for a telephone call based upon the originating point, the destination, the time duration of said call and the rate, said computer comprising a group of rate indicating relays, nine decoding relay groups, and toll charge coding relays, the first three of said nine decoding relay groups with auxiliary relays arranged to decode the originating office code as received from the tabulator, the second three of said nine decoding relay groups with auxiliary relays arranged to decode the destination code and the third group of said nine decoding relay groups with auxiliary relays arranged to decode the time duration of the call, said decoded originating office indication and said decoded destination indication combined through a relay circuit into a base rate indication, said base rate indication and an indication from said rate relays combined in a second relay circuit into a final rate indication, said final rate indication and said decoded time duration indication combined in a third relay circuit into a toll charge indication, said toll charge indication extended to said toll charge indicating relays to produce a coded indication of said toll charge, said toll charge registered in said tabulator which then releases said computer and operably associates a recording means with itself, means in said tabulator for forwarding the ticketing information registered therein to the recording means in any desired order so that the toll ticket may be printed in any desired form.

5. In a telephone system including a first station, a group of second stations, register means accessible to said first station and controllable upon initiation of a call thereat to be extended to one of said second stations for registering the identity of the calling station and the called one of said second stations and controllable thereafter for registering the duration of the call, a means responsive to the termination of a call to compute the charge for said call, said means comprising a toll charge computer arranged to compute the toll charges for a telephone call based upon the originating point, the destination, the time duration of said call and the rate, said computer comprising a group of rate indicating relays, nine decoding relay groups, and toll charge coding relays, the first three of said nine decoding relay groups with auxiliary relays arranged to decode the originating office code as received from the toll ticketing repeaters, the second three of said nine decoding relay groups with auxiliary relays arranged to decode the destination code, and the third group of said nine decoding relay groups with auxiliary relays arranged to decode the time duration of the call, said decoded originating office indication and said decoded destination indication combined through a relay circuit to a base rate indication, said base rate indication and an indication from said rate relays combined in a second relay circuit to a final rate indication, said final rate indication and said decoded time duration indicator combined in a third relay circuit to a toll charge indicator, said toll charge indication extended to said toll charge indicating relays to produce a coded indication of said toll charge to a recording means.

References Cited in the file of this patent

UNITED STATES PATENTS

| | | |
|---|---|---|
| 2,586,704 | Ostline | Feb. 19, 1952 |
| 2,688,658 | Carpenter et al. | Sept. 7, 1954 |